(12) United States Patent
Ohsuge

(10) Patent No.: US 6,768,729 B1
(45) Date of Patent: Jul. 27, 2004

(54) CDMA RECEIVER, PATH DETECTION METHOD, AND RECORDING MEDIUM ON WHICH PATH DETECTION CONTROL PROGRAM IS RECORDED

(75) Inventor: Michihiro Ohsuge, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/404,703

(22) Filed: Sep. 23, 1999

(30) Foreign Application Priority Data

Sep. 24, 1998 (JP) .......................................... 10-269328

(51) Int. Cl.[7] .............................................. H04B 7/216
(52) U.S. Cl. ...................... 370/342; 455/506; 375/148
(58) Field of Search ................................ 370/320, 335, 370/342, 441, 445; 455/504, 506, 63, 65, 67.1, 67.3, 226.1–226.3, 334, 450, 343.1, 343.2, 63.1, 63.3, 67.11, 67.13, 67.14, 67.16; 375/148, 346, 130, 147, 150, 142, 144

(56) References Cited

U.S. PATENT DOCUMENTS

| | | | | | |
|---|---|---|---|---|---|
| 5,812,593 | A | * | 9/1998 | Kaku | 375/208 |
| 5,889,815 | A | * | 3/1999 | Iwakiri | 370/342 |
| 5,949,816 | A | * | 9/1999 | Okamoto | 375/208 |
| 6,188,679 | B1 | * | 2/2001 | Sato | 370/335 |
| 6,229,842 | B1 | * | 5/2001 | Schulist et al. | 375/148 |
| 6,333,934 | B1 | * | 12/2001 | Miura | 370/441 |
| 6,373,882 | B1 | * | 4/2002 | Atarius et al. | 375/148 |

FOREIGN PATENT DOCUMENTS

| | | |
|---|---|---|
| JP | 07231278 | 8/1995 |
| JP | 08181636 | 7/1996 |
| JP | 09181704 | 7/1997 |
| JP | 09298491 | 11/1997 |
| JP | 10094041 | 4/1998 |
| JP | 10-098411 | 4/1998 |
| JP | 10-112673 | 4/1998 |
| JP | 10145326 | 5/1998 |
| JP | 10164011 | 6/1998 |
| JP | 10-190522 | 7/1998 |
| JP | 11008606 | 1/1999 |

* cited by examiner

Primary Examiner—Erika Gary
Assistant Examiner—Eliseo Ramos-Feliciano
(74) Attorney, Agent, or Firm—Scully, Scott, Murphy & Presser

(57) ABSTRACT

A CDMA receiver includes a Rake reception circuit for performing in-phase synthesis of reception signals from a plurality of paths. In this receiver, a delay profile indicating a signal power distribution with respect to delay times of the reception signals is measured. An interference wave power value is estimated on the basis of the measured delay profile. Valid data are extracted from the delay profile on the basis of the estimated interference wave power value. A plurality of correlation peak positions are detected from the extracted valid data. Path allocation to the Rake reception circuit is determined on the basis of the correlation peak positions. A path detection method and recording medium which records a path detection control program are also disclosed.

59 Claims, 22 Drawing Sheets

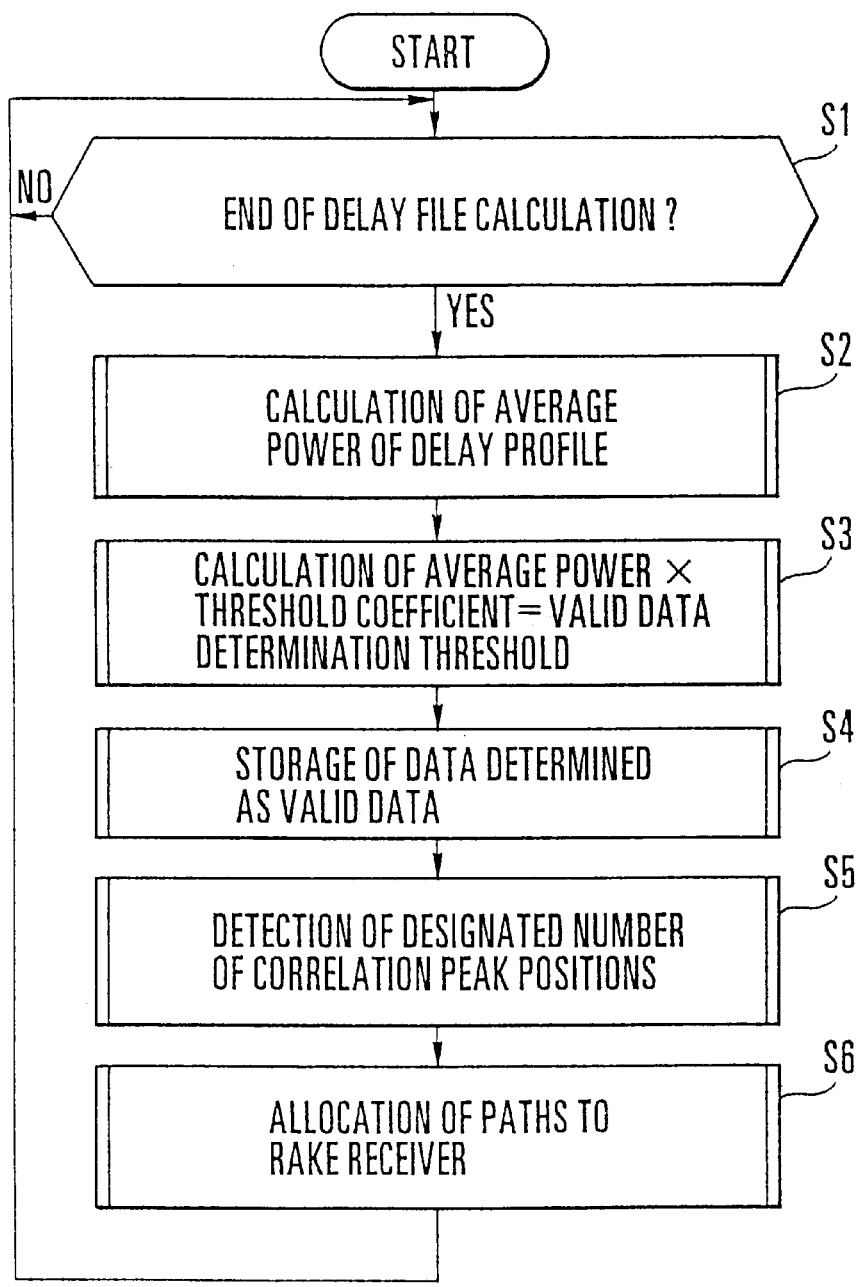
F I G. 2

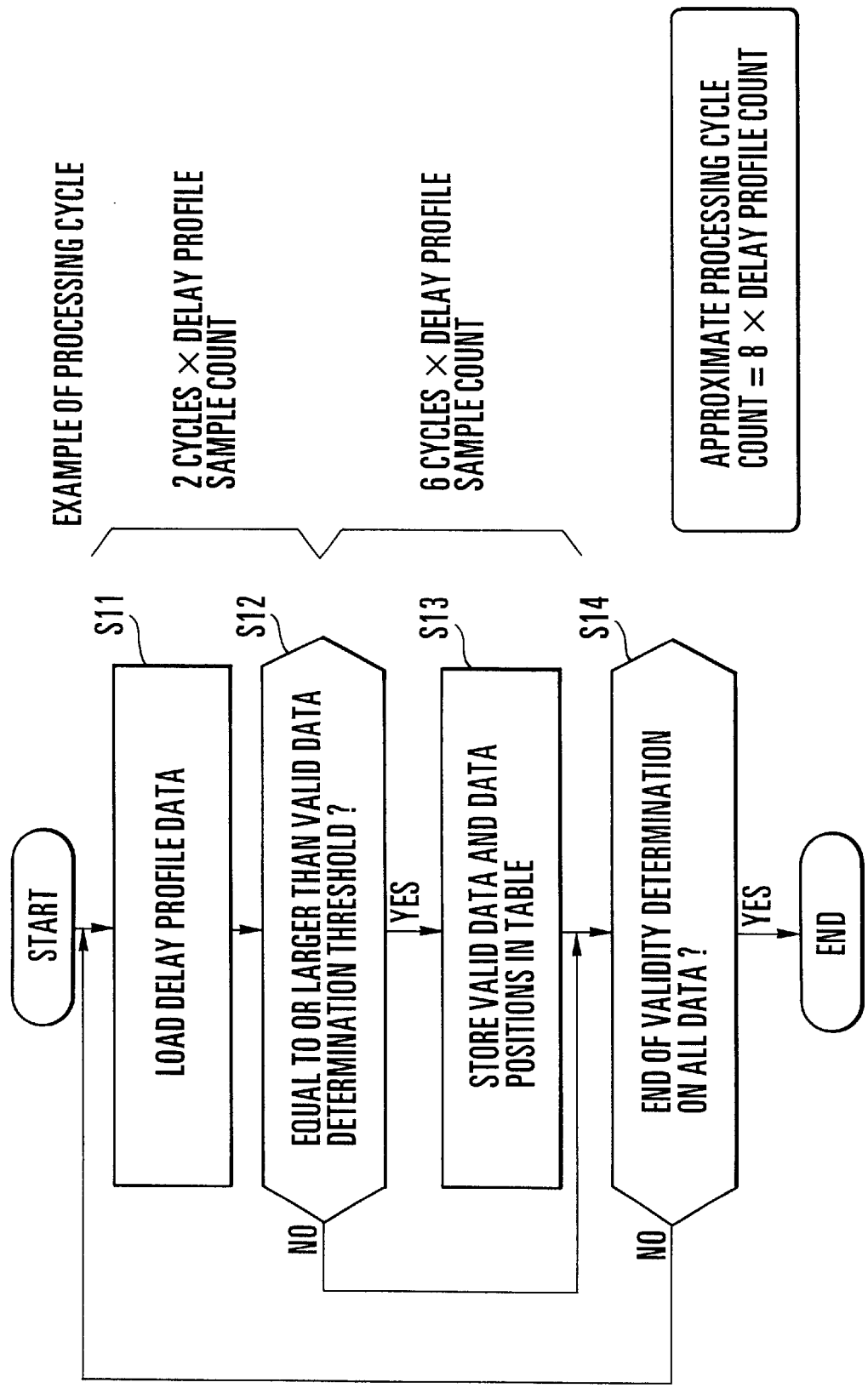
F I G. 3

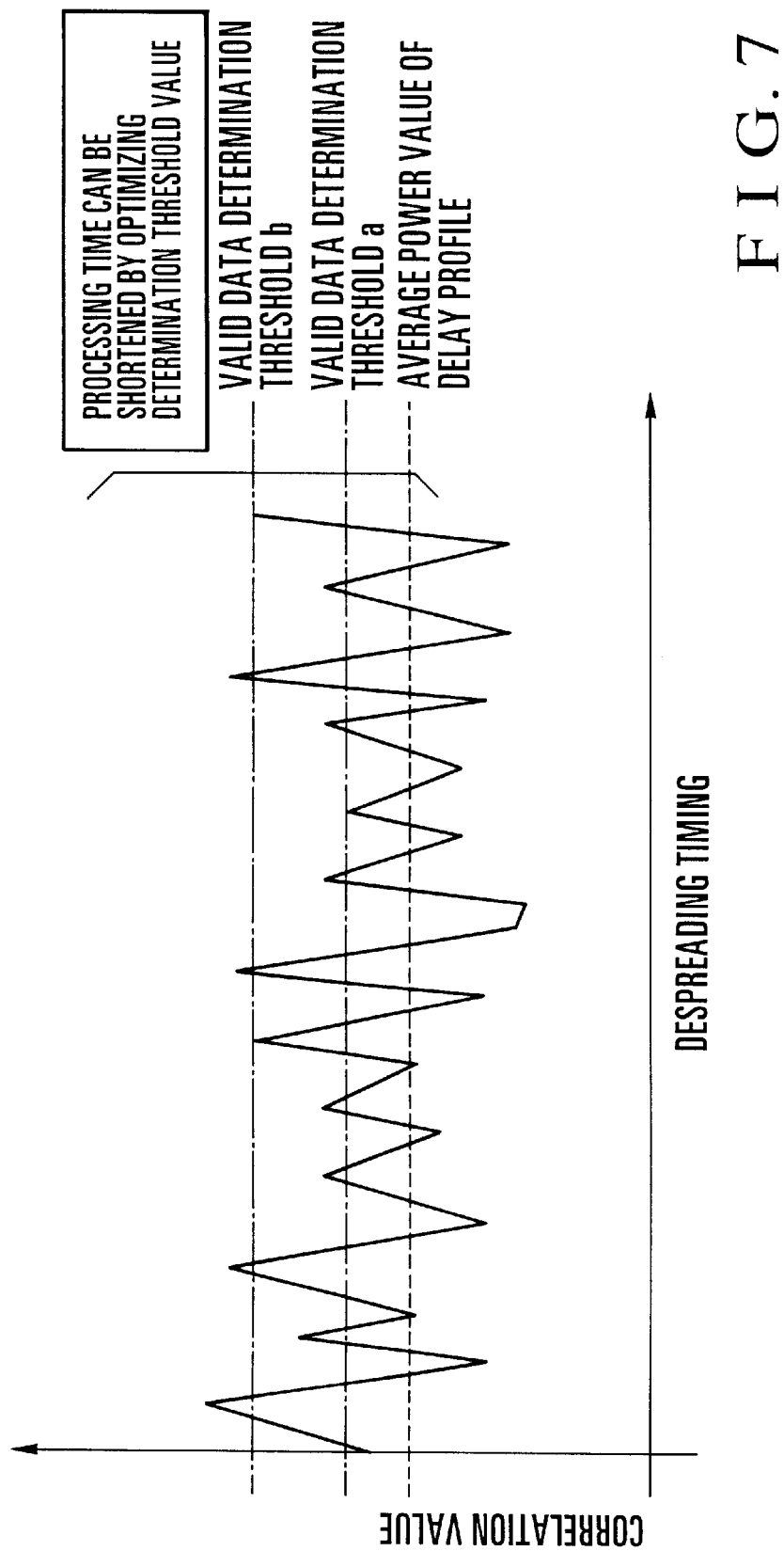
F I G. 7

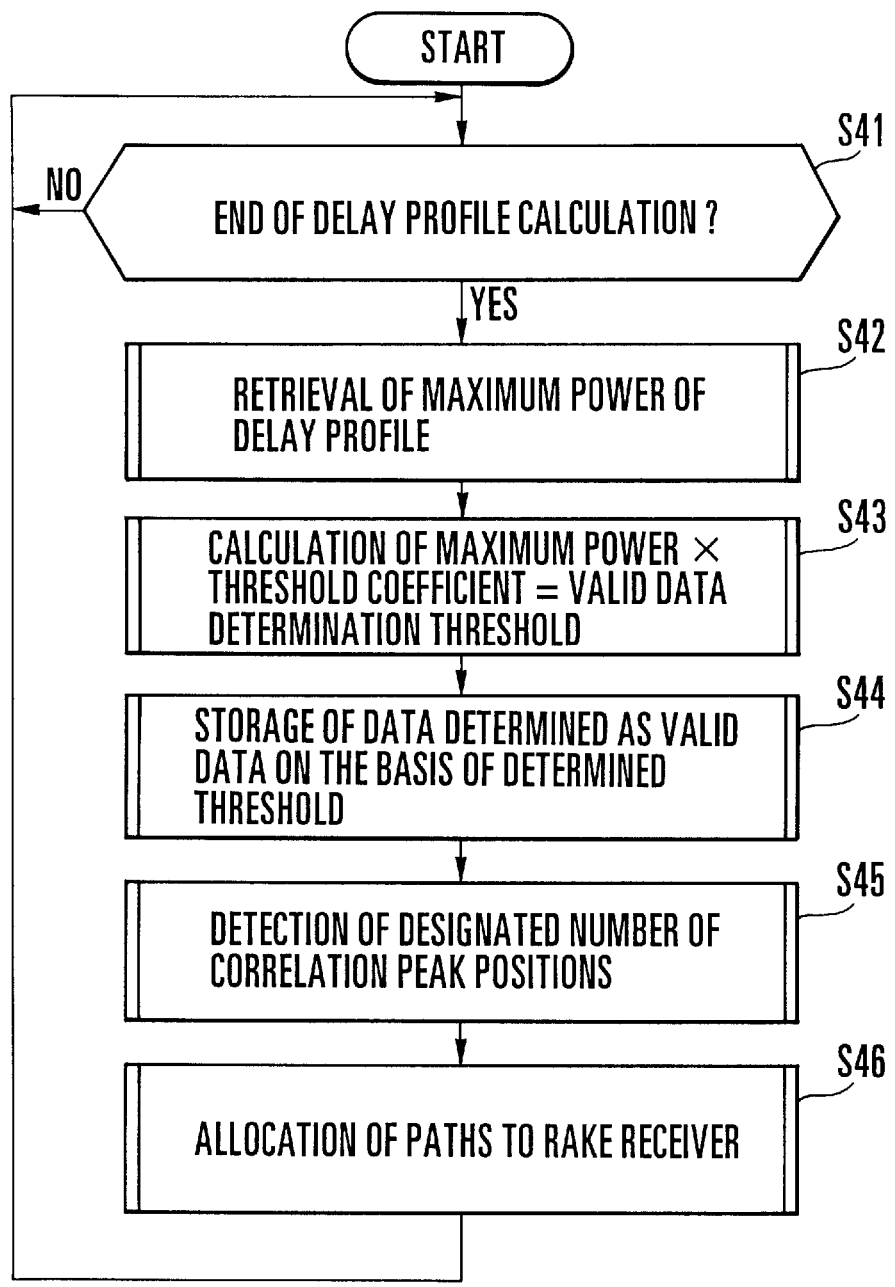
F I G. 9

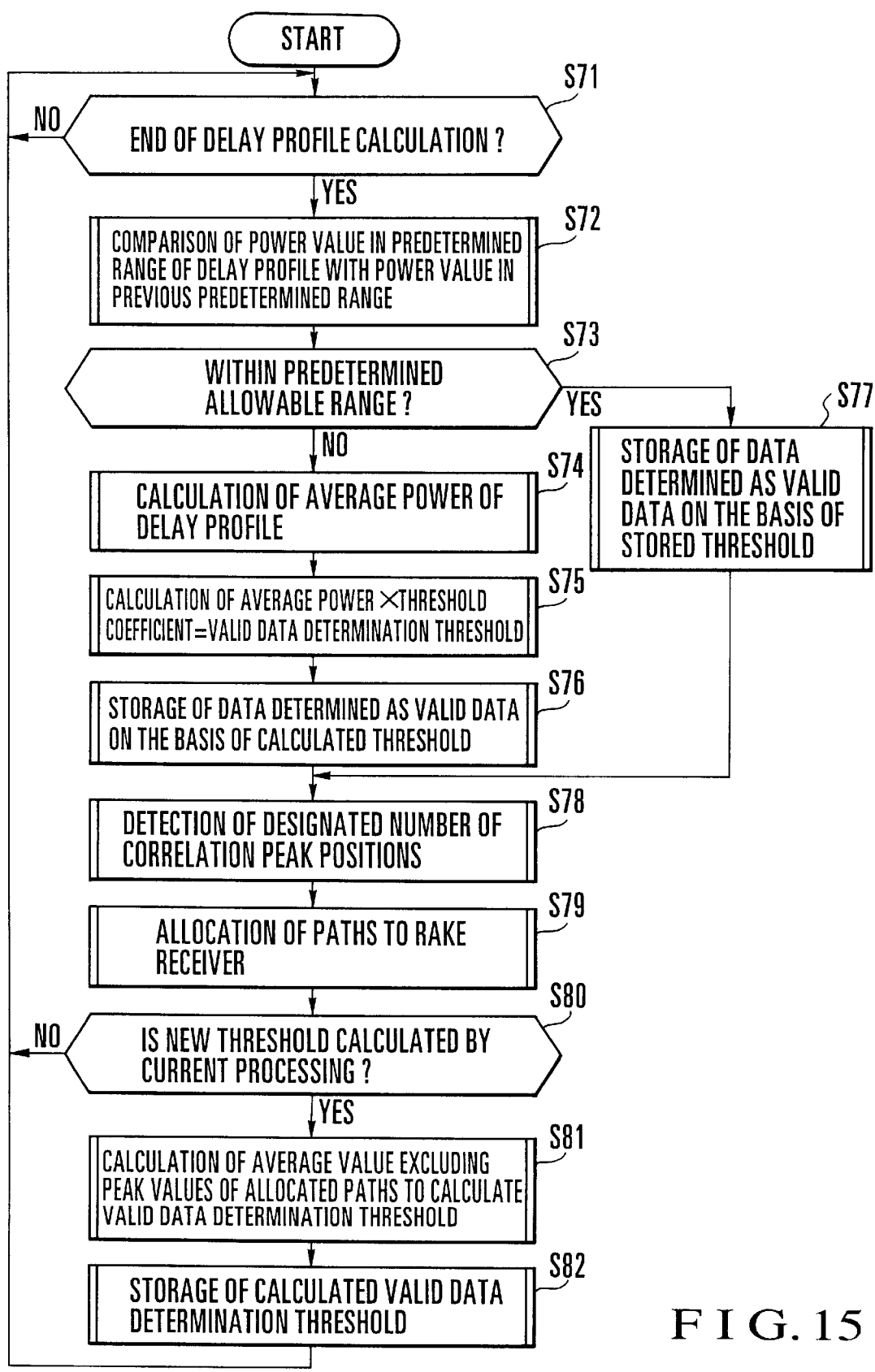
F I G. 15

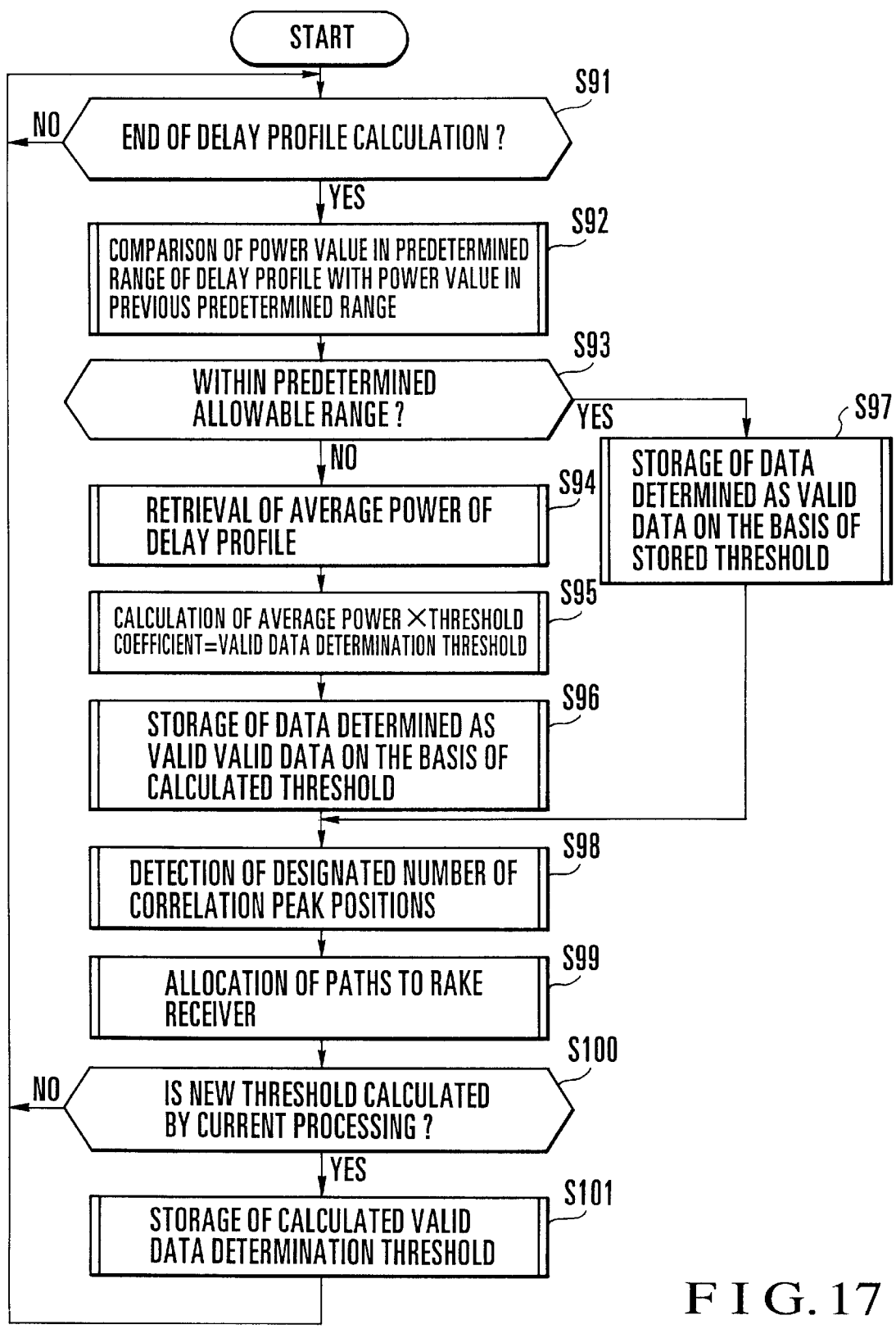
F I G. 17

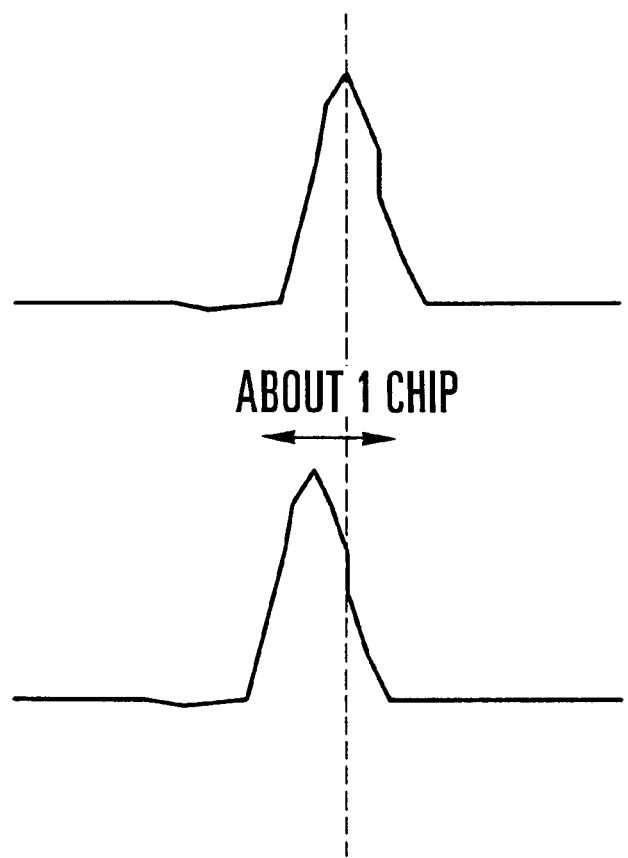
F I G. 21

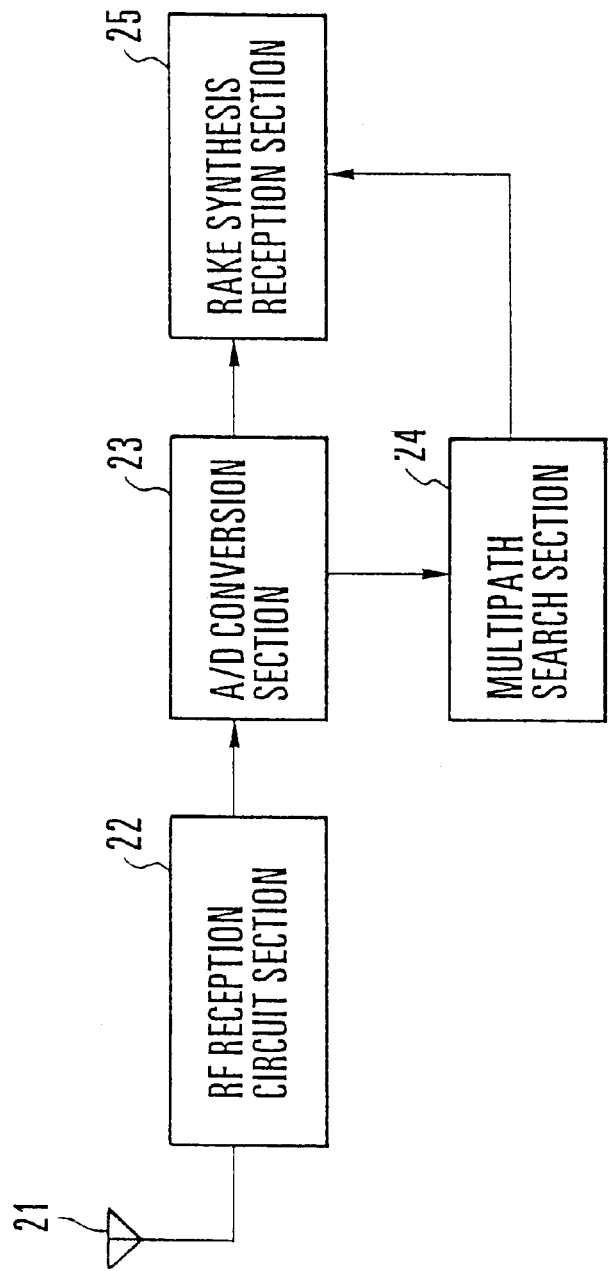
FIG. 22 -PRIOR ART-

CDMA RECEIVER, PATH DETECTION METHOD, AND RECORDING MEDIUM ON WHICH PATH DETECTION CONTROL PROGRAM IS RECORDED

BACKGROUND OF THE INVENTION

The present invention relates to a CDMA receiver, path detection method used therefor, and recording medium which records a path detection control program and, more particularly, to a technique of measuring a delay profile and selecting several paths having high signal powers within the measurement range.

DS-CDMA (Direct Sequence-code Division Multiple Access) is a scheme of allowing a plurality of users to perform communication by using the same frequency band. In this scheme, spreading codes are used to identify the respective users.

In mobile communication, since multiplex reception waves vary in propagation path length, multiplex waves with different propagation delay times interfere with each other. In DS-CDMA communication, since information data is band-spread by a high-rate spreading code having a period shorter than the propagation time, the respective multiplex waves with different propagation delay times can be demultiplexed/extracted.

Since the position of a mobile station changes with respect to a base station, this delay profile (the signal power distribution with respect to delay times) also changes over time. In addition, a signal from each path is subjected to Rayleigh variation in a place with obstacles.

In DS-CDMA communication, a plurality of multipath signals that are temporally separated from each other, have different propagation delay times, and undergo Rayleigh variations are collected and in-phase-synthesized (Rake-synthesized) to obtain a diversity effect, thereby improving reception characteristics. With regard to a predetermined reception quality (bit error rate), the transmission power can be reduced owing to the diversity effect accompanying Rake synthesis. As a consequence, the interference powers with respect to other users inside and outside a single cell decrease. This makes it possible to increase the subscriber capacity in a predetermined frequency band.

As described above, however, since the position of each mobile station relatively changes with respect to the base station, the delay profile also changes, and the delay times of the paths to be subjected Rake synthesis also change. This makes it necessary for a receiver to have multipath search and tracking functions that allow the receiver to follow changes in delay profile under a mobile communication environment and Rake-synthesize a plurality of paths capable of instantaneously obtaining maximum signal powers.

As the CDMA receiver described above, the receiver shown in FIG. 22 is available, which is comprised of an antenna 21, RF reception circuit section 22, A/D (Analog/Digital) conversion section 23, multipath search section (multipath detection means) 24, and Rake synthesis reception section 25 for in-phase-synthesizing (Rake-synthesizing) a plurality of paths.

In the conventional CDMA receiver having such an arrangement, the multipath search section 24 measures a delay profile (a signal power distribution with respect to delay times), selects several paths having high signal powers within the measurement range, and notifies the Rake synthesis reception section 25 of the timings of the paths. The Rake synthesis reception section 25 performs despreading in units of paths on the basis of the timing information, and performs Rake synthesis, thereby obtaining a path diversity effect.

The Rake synthesis reception section 25 may have a means (path tracking means) for following the movement of an independently designated path. In this case, the multipath search section 24 must send path information to the Rake synthesis reception section 25 at least in an initial period or in predetermined cycles. This CDMA receiver and multipath search method are disclosed in Japanese Patent Laid-Open No. 9-181704 or the like.

In the above conventional CDMA receiver, the multipath search section measures a delay profile, selects several paths having high signal powers within the measurement range, and notifies the Rake synthesis reception section of the timings of the paths.

In general, however, a delay profile contains a large quantity of data, and hence it takes time to search for peaks from all the data. For this reason, to search for several paths from the measured delay profile, maximum values corresponding to the number of paths to be searched out must be retrieved, or all the profile data must be sorted.

It therefore takes much time to perform maximum value retrieval by using a DSP (Digital Signal Processor) or the like. In addition, the current consumption increases. When maximum value retrieval is implemented by hardware, the hardware size becomes large, and an optimal means for searching for a required number of correlation peaks from a delay profile is required.

SUMMARY OF THE INVENTION

It is an object of the present invention to provide a CDMA receiver, path detection method, and recording medium which records a path detection control program, which can greatly reduce the processing amount in a path search section, reduce current consumption, simplify the hardware arrangement, and improve follow-up characteristics with respect to changes in path.

In order to achieve the above object, according to the present invention, there is provided a CDMA receiver comprising a Rake reception circuit for performing in-phase synthesis of reception signals from a plurality of paths, wherein a delay profile indicating a signal power distribution with respect to delay times of the reception signals is measured, an interference wave power value is estimated on the basis of the measured delay profile, valid data are extracted from the delay profile on the basis of the estimated interference wave power value, a plurality of correlation peak positions are detected from the extracted valid data, and path allocation to the Rake reception circuit is determined on the basis of the correlation peak positions.

BRIEF DESCRIPTION OF THE DRAWINGS

FIG. 2 is a flow chart showing the operation of a DSP in FIG. 1;

FIG. 3 is a flow chart showing the operation of a valid data determination section in FIG. 1;

FIG. 7 is a graph showing another example of the delay profile measurement result in the first embodiment of the present invention;

FIG. 9 is a flow chart showing the operation of a DSP in FIG. 8;

FIG. 15 is a flow chart showing the operation of a DSP in FIG. 14;

FIG. 17 is a flow chart showing the operation of a DSP in FIG. 16;

FIG. 21 is a graph for explaining follow-up operation with respect to changes in path delay time in the present invention; and FIG. 22 is a block diagram showing an example of the arrangement of a conventional CDMA receiver.

DESCRIPTION OF THE PREFERRED EMBODIMENTS

The embodiments of the present invention will be described in detail next with reference to the accompanying drawings.

First Embodiment

Figure 1:
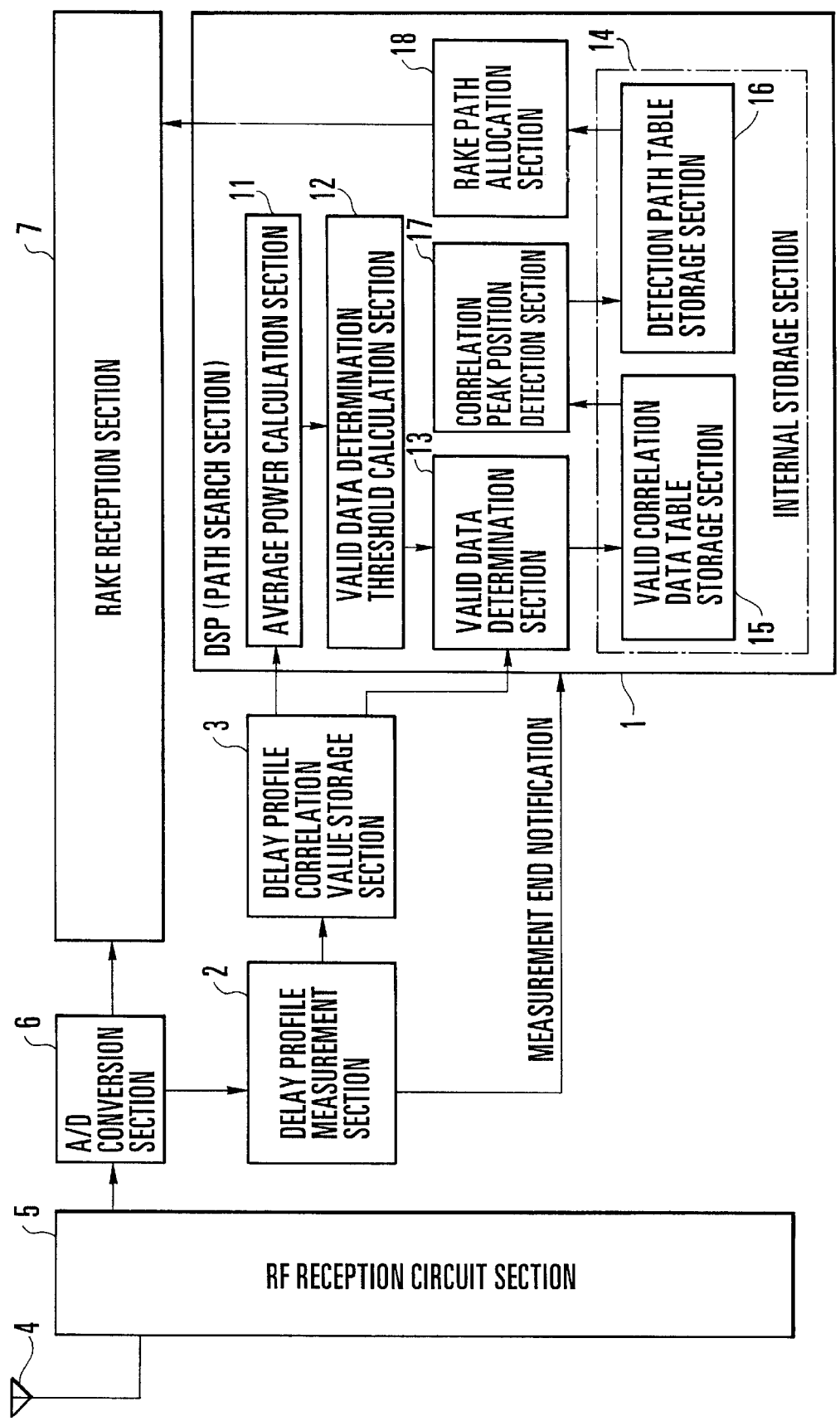
FIG. 1 is a block diagram showing the arrangement of a Rake receiver according to the first embodiment of the present invention.

FIG. 1 shows the arrangement of a Rake receiver according to the first embodiment of the present invention. The Rake receiver according to the first embodiment of the present invention is comprised of a DSP (Digital Signal Processor) 1 forming a path search section, delay profile measurement section 2, delay profile correlation value storage section 3 formed by a RAM (Random Access Memory) for temporarily storing delay profile data, antenna 4, RF reception circuit section 5, A/D (Analog/Digital) conversion section 6 for converting an analog signal into a digital signal, and a Rake reception section 7 for performing in-phase synthesis of reception signals from a plurality of paths.

The DSP 1 includes an average power calculation section 11, valid data determination threshold calculation section 12, valid data determination section 13, internal storage section (RAM) 14 including a valid correlation data table storage section 15 and detected path table storage section 16, correlation peak position detection section 17, and Rake path allocation section 18. The DSP 1 operates under program control based on the programs stored in a control memory (not shown). As the DSP 1, a DSP dedicated to path searches need not always be used. For example, this receiver may incorporate another function such as speech codec.

The average power calculation section 11 of the DSP 1 calculates the average power of a delay profile. On the basis of the calculation result obtained by the average power calculation section 11, the valid data determination threshold calculation section 12 calculates a valid data threshold (interference wave power value) for checking whether the correlation data of a delay profile is data from a valid path.

The valid data determination section 13 determines the valid data of a delay profile on the basis of the valid data determination threshold calculated by the valid data determination threshold calculation section 12, and selects only valid correlation data. The valid correlation data table storage section 15 temporarily stores the data selected by the valid data determination section 13.

The correlation peak position detection section 17 detects the positions of a plurality of correlation peaks (paths). The detected path table storage section 16 stores the path positions detected by the correlation peak position detection section 17. The Rake path allocation section 18 determines path allocation to the Rake reception section 7.

The analog signal received by the RF reception circuit section 5 through the antenna 4 is converted into digital data by the A/D conversion section 6. The delay profile measurement section 2 can be formed by a matched filter or sliding correlator. The delay profile measurement section 2 measures the delay time distribution (delay profile) of the correlation power values of despreading codes and reception data within a predetermined range.

Figure 6:
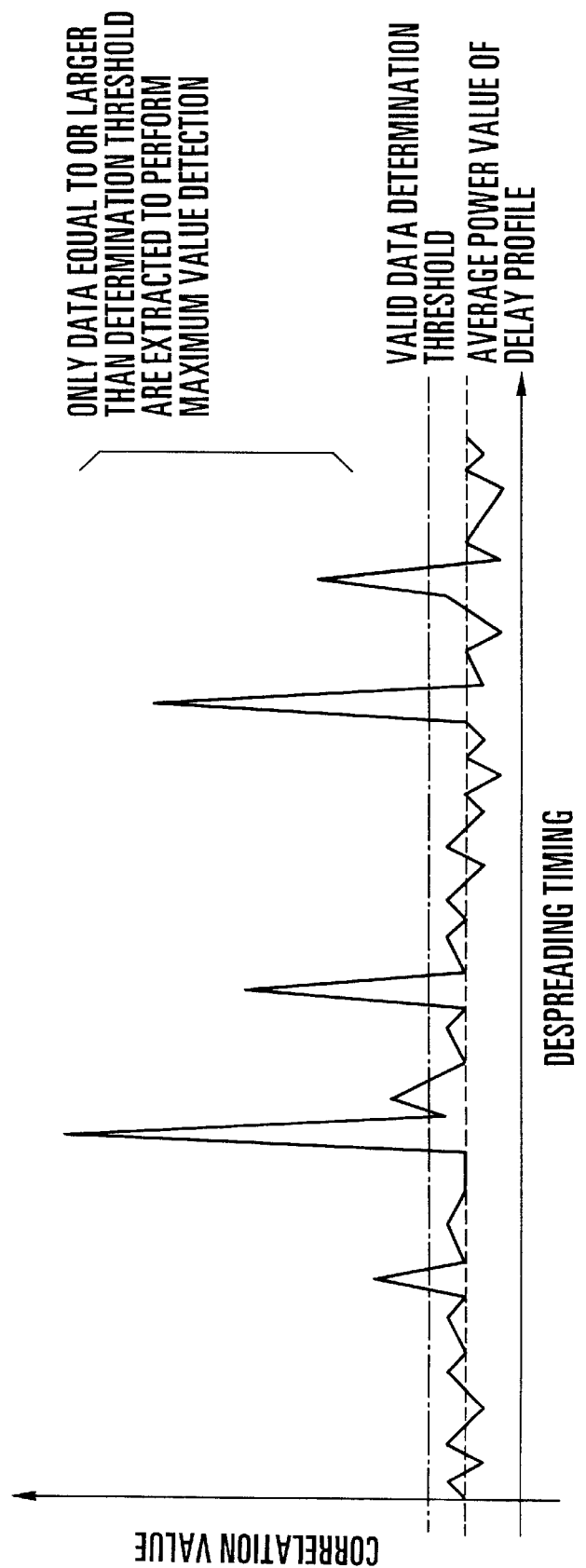
FIG. 6 is a graph showing an example of a delay profile measurement result in the first embodiment of the present invention.

In the Rake receiver according to the first embodiment of the present invention, the average power calculation section 11 of the DSP 1 calculates the average power of delay profile data to average path changes due to fading. FIG. 6 shows an example of the measured delay profile.

The delay profile measured by the delay profile measurement section 2 is output to the delay profile correlation value storage section 3, and a message indicating the end of measurement is transmitted from the delay profile measurement section 2 to the DSP 1.

The average power calculation section 11 of the DSP 1 averages the data of the delay profile obtained at intervals of delay times to obtain the average power value of the profile. When correlation data corresponding to X despreading timings (delay times: abscissa) in the case shown in FIG. 6 are sampled, the sum total of the correlation data at the times 1 to X is divided by a sample count X. As a consequence, the average power calculation section 11 obtains an average delay profile power value like the one shown in FIG. 6.

The valid data determination threshold calculation section 12 multiplies the average power calculated by the average power calculation section 11 by a predetermined value to absorb the variance of interference wave levels (portions having no correlation peaks). As shown in FIG. 6, a valid data determination threshold can be obtained by multiplying the average power by a coefficient (e.g., 1.5) that makes all the floor portions (interference wave power components) having low correlation values in the delay profile become equal to or smaller than the threshold. Note that the valid data determination threshold calculation section 12 can also calculate a valid data determination threshold by adding/subtracting the above coefficient to/from the average power or dividing it by the coefficient.

As the above coefficient, optimal data may be determined by acquiring delay profile data in an actual communication environment. Alternatively, since the variance changes depending on the average time (the sum of power value) of a delay profile, a coefficient that changes in accordance with this delay profile averaging time may be used.

The valid data determination section 13 writes the correlation values and phases of delay profile data equal to or larger than the valid data determination threshold in the valid correlation data table storage section 15. The correlation peak position detection section 17 detects a predetermined number of correlation peaks (multipath positions) from the valid correlation data stored in the valid correlation data table storage section 15, and writes the detected peaks in the detected path table storage section 16.

The Rake path allocation section 18 allocates paths to the Rake reception section 7 on the basis of the path data stored in the detected path table storage section 16. For example, as a path allocation method, a method of designating a maximum of paths that can be Rake-synthesized to the Rake reception section 7 in descending order in magnitude is available. In this case, when only one path is detected, the Rake path allocation section 18 designates only the detected path even if the number of paths set is six. Note that the valid correlation data table storage section 15 and detected path table storage section 16 use the internal storage section 14 incorporated in the DSP 1.

FIG. 2 shows the operation of the DSP 1 in FIG. 1. The path search processing performed by the Rake receiver according to the first embodiment of the present invention will be described with reference to FIGS. 1 and 2. The processing shown in FIG. 2 is implemented when the DSP 1 executes the programs stored in the control memory. The control memory may be set in the internal storage section 14. Alternatively, a ROM (Read-Only Memory), floppy disk, or the like may be used.

Upon reception of a signal indicating the end of delay profile calculation from the delay profile measurement section 2 (step Si in FIG. 2), the average power calculation section 11 of the DSP 1 calculates an average delay profile power (step S2 in FIG. 2). The valid data determination threshold calculation section 12 calculates a valid data determination threshold by multiplying the average power obtained by the average power calculation section 11 by a predetermined threshold coefficient (constant) (step S3 in FIG. 2).

The valid data determination section 13 extracts data equal to or larger than the valid data determination threshold calculated by the valid data determination threshold calculation section 12 from the delay profile data, and stores the values and positions of the valid data in the valid correlation data table storage section 15 (step S4 in FIG. 2).

The correlation peak position detection section 17 detects a predetermined number of correlation peaks from the data stored in the valid correlation data table storage section 15, and stores the magnitudes and positions of the corresponding paths in the detected path table storage section 16 (step S5 in FIG. 2).

Finally, the Rake path allocation section 18 designates the path detected by the detected path to the Rake reception section 7 (step S6 in FIG. 2). Subsequently, the DSP 1 waits until a measurement end signal is received from the delay profile measurement section 2, and repeatedly performs the same processing as described above.

FIG. 3 shows the processing performed by the valid data determination section 13 in FIG. 1. FIG. 3 shows an example of a processing cycle, together with the processing performed by the valid data determination section 13. The processing performed by the valid data determination section 13 will be described with reference to FIG. 1 and 3.

The valid data determination section 13 loads correlation data one by one from the delay profile correlation value storage section 3 (step S11 in FIG. 3), and then checks whether the value of each data is equal to or larger than the valid data determination threshold (step S12 in FIG. 3).

If the correlation data loaded from the delay profile correlation value storage section 3 is equal to or larger than the threshold, the valid data determination section 13 determines that the data is valid, and stores the value and position of the data in the valid correlation data table storage section 15 (step S13 in FIG. 3).

The valid data determination section 13 repeatedly performs the above processing until determination on all delay profile data is completed (step S14 in FIG. 3). When determination on all the delay profile data is completed, the above processing is terminated.

When the above validity determination and storage processing are implemented by a general-purpose DSP, the approximate processing cycle count is 8× delay profile sample count (the number of delay profile data), as shown in FIG. 3.

Figure 4:
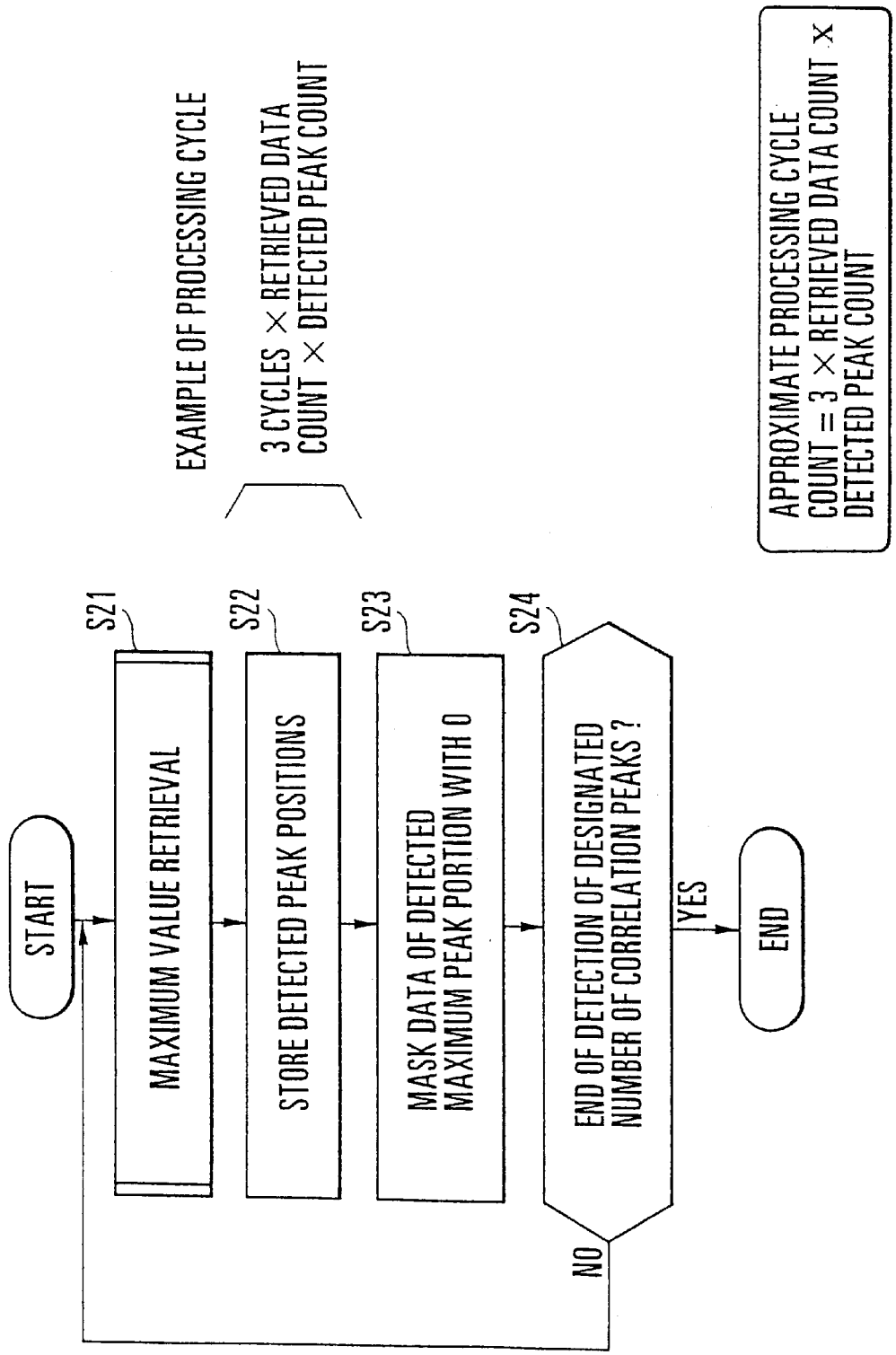
FIG. 4 is a flow chart showing the operation of a correlation peak position detection section in FIG. 1.

FIG. 4 shows the processing performed by the correlation peak position detection section 17 in FIG. 1. FIG. 4 shows an example of a processing cycle, together with the processing performed by the correlation peak position detection section 17. The processing performed by the correlation peak position detection section 17 will be described with reference to FIGS. 1 and 4.

The correlation peak position detection section 17 performs maximum value retrieval to detect a plurality of peaks (step S21 in FIG. 4), and stores the maximum peak positions (step S22 in FIG. 4). The correlation peak position detection section 17 then masks the data at the detected peak positions (masks the data of the detected maximum peak portions with 0) (step S23 in FIG. 4).

The correlation peak position detection section 17 removes the data at the detected peak positions by masking the data at the peak positions. Subsequently, the correlation peak position detection section 17 repeatedly performs the same processing as described above for the data at the remaining peak positions by a predetermined number of detected peaks (step S24 in FIG. 4). When the above correlation peak detection processing is implemented by a general-purpose DSP, the approximate processing cycle count is 3×retrieved data count×detected peak count, as shown in FIG. 4. In this case, a maximum value retrieval flow chart to be described later is used.

Figure 5:
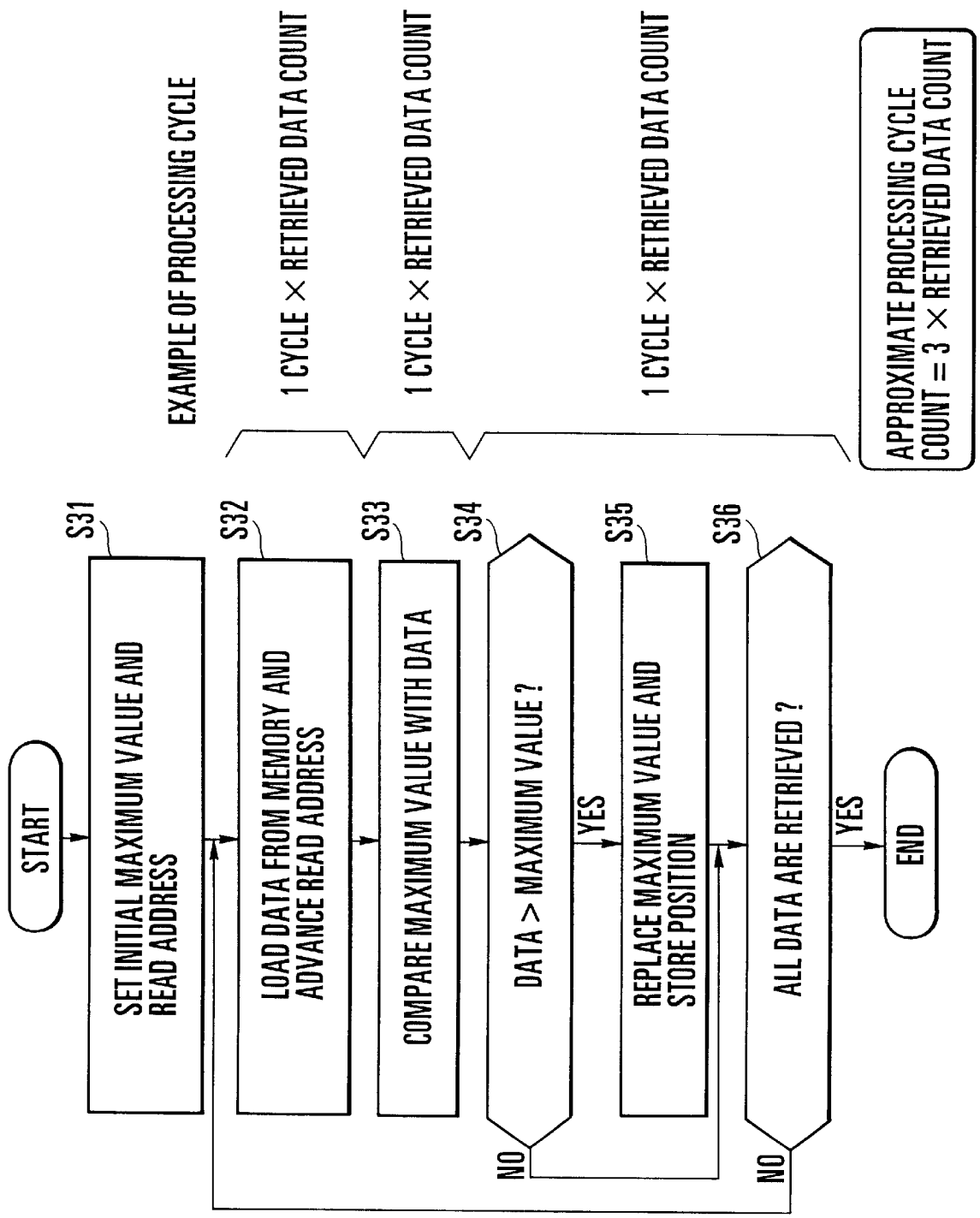
FIG. 5 is a flow chart showing the maximum value retrieval processing performed by the correlation peak position detection section.

FIG. 5 shows maximum value retrieval processing performed by the correlation peak position detection section 17 in FIG. 1. FIG. 5 shows an example of a processing cycle, together with the processing performed by the correlation peak position detection section 17. The maximum value retrieval processing performed by the correlation peak position detection section 17 will be described with reference to FIGS. 1 and 5.

First of all, the correlation peak position detection section 17 loads the initial maximum value (e.g., sets the value of the first data) and sets a retrieval start address (step S31 in FIG. 5). The correlation peak position detection section 17 then loads data from the valid correlation data table storage section 15 and advances the read address to the next data position (step S32 in FIG. 5).

The correlation peak position detection section 17 compares the data loaded from the valid correlation data table storage section 15 with the maximum value data (step S33 in FIG. 5). If the data is larger than the maximum value (step S34 in FIG. 5), the correlation peak position detection section 17 replaces the maximum value and stores the maximum value position in the detected path table storage section 16 (step S35 in FIG. 5).

The correlation peak position detection section 17 repeatedly performs the same processing as described above until all retrieved data are compared with the maximum value (step S36 in FIG. 5). When the above maximum value retrieval processing is implemented by a general-purpose DSP, the approximate processing cycle count is 3×retrieved data count, as shown in FIG. 5.

As described above, with regard to path search processing amount, when only a general maximum value retrieval procedure is used, a processing cycle count of about (3×delay profile data count×detected peak count) is required. With the use of the retrieval method according to the first embodiment of the present invention, however, retrieval targets can be narrowed down to data equal to or larger than a calculated valid data determination threshold, and hence the retrieved data count can be reduced in advance. This can greatly reduced the processing cycle count.

If, for example, a delay profile like the one shown in FIG. 6 is measured, the number of data determined as valid data becomes about 1/30 of the original delay profile data. In this case, the processing cycle count is given by (validity determination cycle count+peak detection cycle count+average power calculation cycle count)=(8× delay profile data count)+(3×delay profile data/30× detected peak count)+(average power calculation cycle count)

In addition, since average power calculation can be implemented by about (1×delay profile data count) cycles, the total processing count is given by total processing count=((9+detected peak count/10)× delay profile data count)

Consider a case wherein the detected peak count is 10. In this case, (300×delay profile data count) cycles are required without validity determination, whereas (10×delay profile data count) cycles are required with validity determination. The insertion of validity determination can therefore reduce the processing amount to about 1/30.

In contrast to this, if no noticeable peaks appear in a delay profile as shown in FIG. 7, i.e., only data like noise is measured, a processing count larger than that described above is required. In this case, the ratio of the above effective data to the delay profile data may be improved by only about 1/30 to ½. Even in this case, the insertion of validity determination can reduce the processing amount to about ½. In addition, by optimizing a threshold coefficient, the processing amount can be further reduced even if no peaks appear.

Second Embodiment

Figure 8:
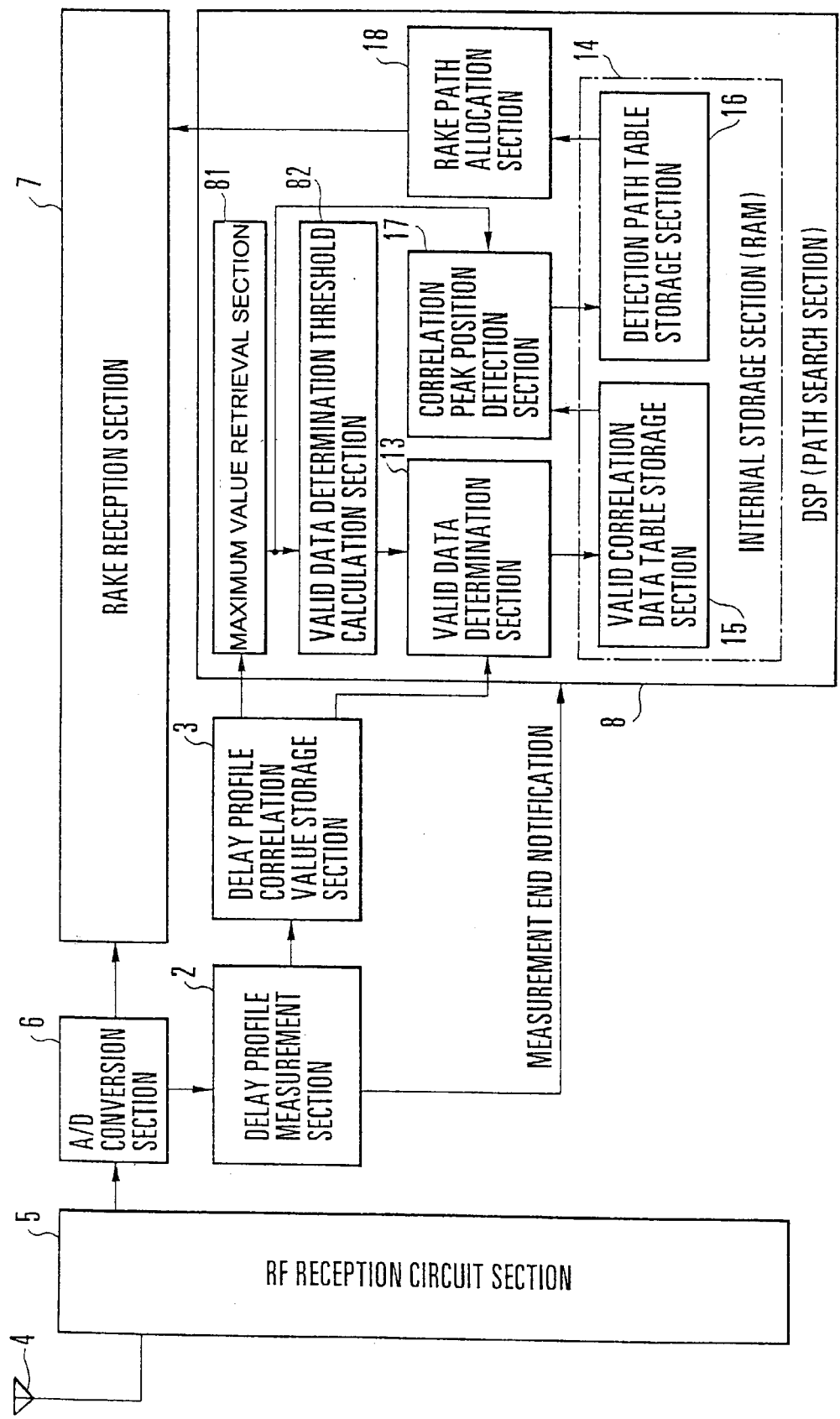
FIG. 8 is a block diagram showing the arrangement of a Rake receiver according to the second embodiment of the present invention.

FIG. 8 shows the arrangement of a Rake receiver according to the second embodiment of the present invention. The same reference numerals as in FIG. 1 denote the same parts in FIG. 8. The Rake receiver according to the second embodiment of the present invention has the same arrangement as that of the Rake receiver according to the first embodiment of the present invention except that a maximum value retrieval section 81 is arranged in a DSP 8 instead of the average power calculation section 11, and a valid data determination threshold calculation section 82 calculates a valid data determination threshold from the retrieval result obtained by the maximum value retrieval section 81. In addition, the operations of the same constituent elements as those of the Rake receiver according to the first embodiment of the present invention are the same as those thereof.

The maximum value retrieval section 81 performs retrieves the maximum value of the correlation data loaded from a delay profile correlation value storage section 3 before a valid data determination section 13 performs validity determination. The valid data determination threshold calculation section 82 determines the value obtained by multiplying the maximum peak value retrieved by the maximum value retrieval section 81 by X (X is a predetermined ratio, e.g., 6 dB) as a valid data determination threshold. In this case, the valid data determination threshold calculation section 82 can calculate a valid data determination threshold by adding/subtracting the value X to/from the maximum peak value or dividing it by the value X like the valid data determination threshold calculation section 12 in FIG. 1.

The valid data determination section 13 writes the correlation values and phases of delay profile data equal to or larger than the valid data determination threshold calculated by the valid data determination threshold calculation section 82 in a valid correlation data table storage section 15.

A correlation peak position detection section 17 detects a predetermined number of correlation peaks (multipath positions) from the valid correlation data stored in the valid correlation data table storage section 15, and writes them in a detected path table storage section 16.

A Rake path allocation section 18 allocates paths to a Rake reception section 7 on the basis of the path data stored in the detected path table storage section 16. This can improve the validity determination precision.

FIG. 9 shows the processing performed by the DSP 8 in FIG. 8. The path search processing performed by the Rake receiver according to the second embodiment of the present invention will be described with reference to FIGS. 8 and 9. The processing shown in FIG. 9 is implemented when the DSP 8 executes the programs stored in a control memory. The control memory may be set in an internal storage section 14. Alternatively, a ROM, floppy disk, or the like may be used.

Upon reception of a signal indicating the end of delay profile calculation from a delay profile measurement section 2 (step S41 in FIG. 9), the maximum value retrieval section 81 of the DSP 8 retrieves the maximum value of the correlation data loaded from the delay profile correlation value storage section 3 before the valid data determination section 13 performs validity determination (step S42 in FIG. 9). The valid data determination threshold calculation section 82 calculates a valid data determination threshold by performing calculation (multiplication) for the maximum value retrieved by the maximum value retrieval section 81 using a predetermined threshold coefficient (constant) (step S43 in FIG. 9).

The valid data determination section 13 extracts data equal to or larger than the valid data determination threshold calculated by the valid data determination threshold calculation section 82 from the delay profile data, and stores the values and positions of the valid data in the valid correlation data table storage section 15 (step S44 in FIG. 9).

The correlation peak position detection section 17 detects a predetermined number of correlation peaks from the data stored in the valid correlation data table storage section 15, and stores the magnitudes and positions of the corresponding paths in the detected path table storage section 16 (step S45 in FIG. 9).

Finally, the Rake path allocation section 18 designates the detected paths to the Rake reception section 7 (step S46 in FIG. 9). Subsequently, the DSP 8 waits until a measurement end signal is received from the delay profile measurement section 2, and repeatedly performs the above processing. Note that the maximum peak value retrieved by the maximum value retrieval section 81 is also used in the correlation peak position detection processing performed by the correlation peak position detection section 17.

Figure 10:
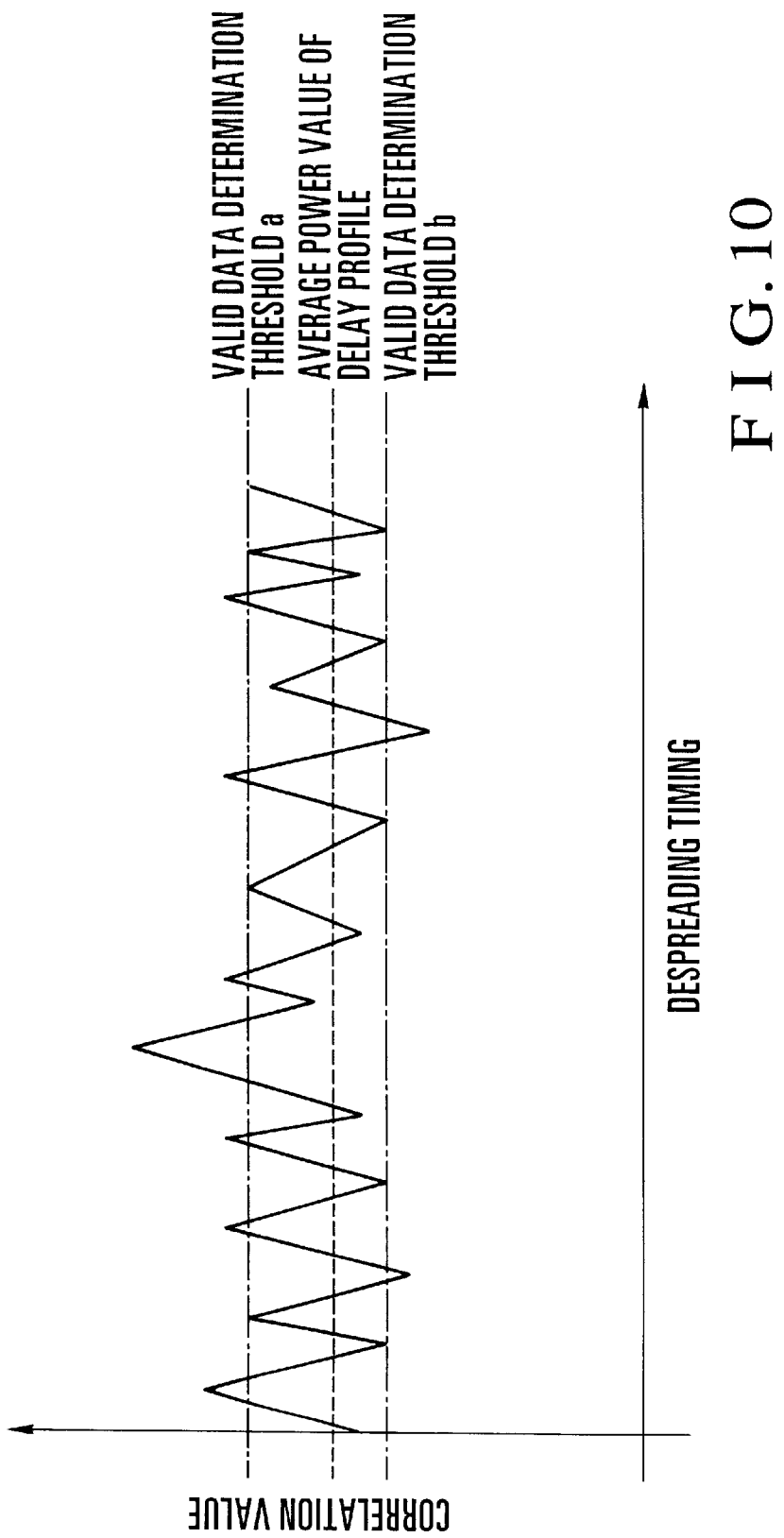
FIG. 10 is a graph showing an example of the delay profile measurement result obtained when the valid data determination threshold calculated on the basis of an average power is valid in the present invention.
Figure 11:
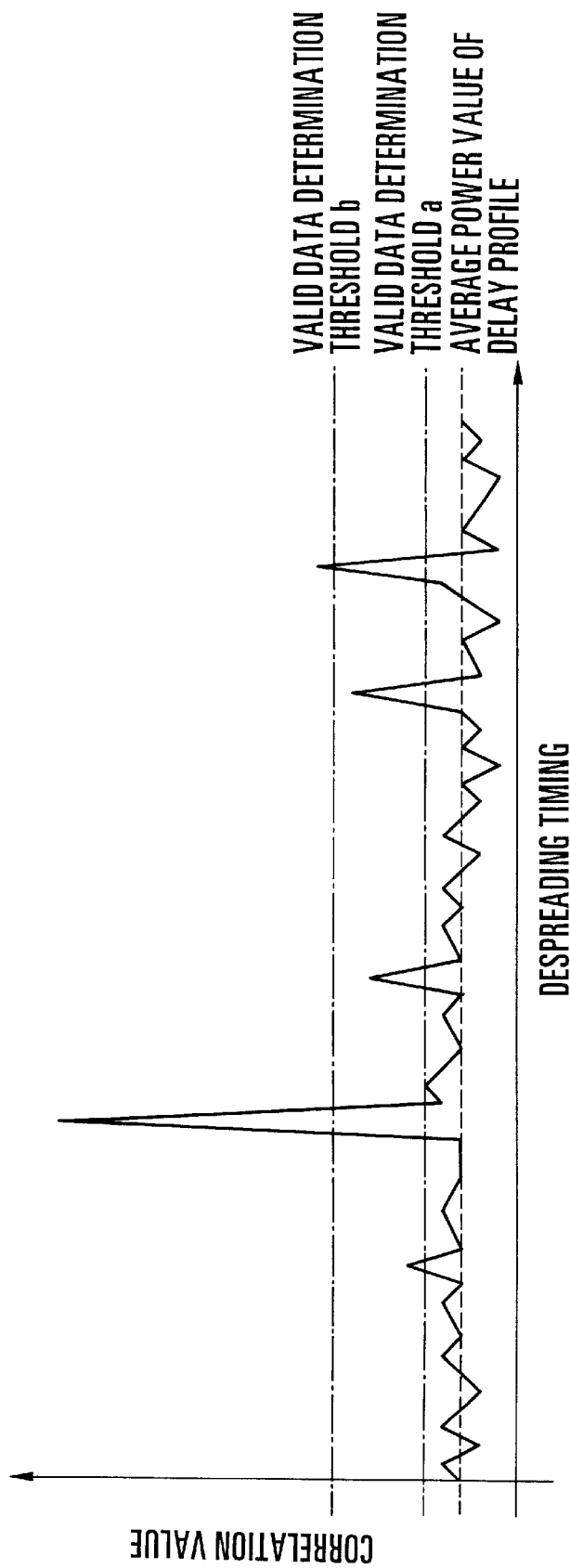
FIG. 11 is a graph showing an example of the delay profile measurement result obtained when the valid data determination threshold calculated on the basis of a maximum value is valid in the present invention.

In the second embodiment of the present invention, a more effective processing result can be obtained when noticeable peaks appear in a delay profile, as shown in FIG. 11, i.e., data in which peaks having larger correlation values than noise appear is measured, than when no noticeable peaks appear in a delay profile, as shown in FIG. 10, i.e., only data like noise can be measured.

Third Embodiment

Figure 12:
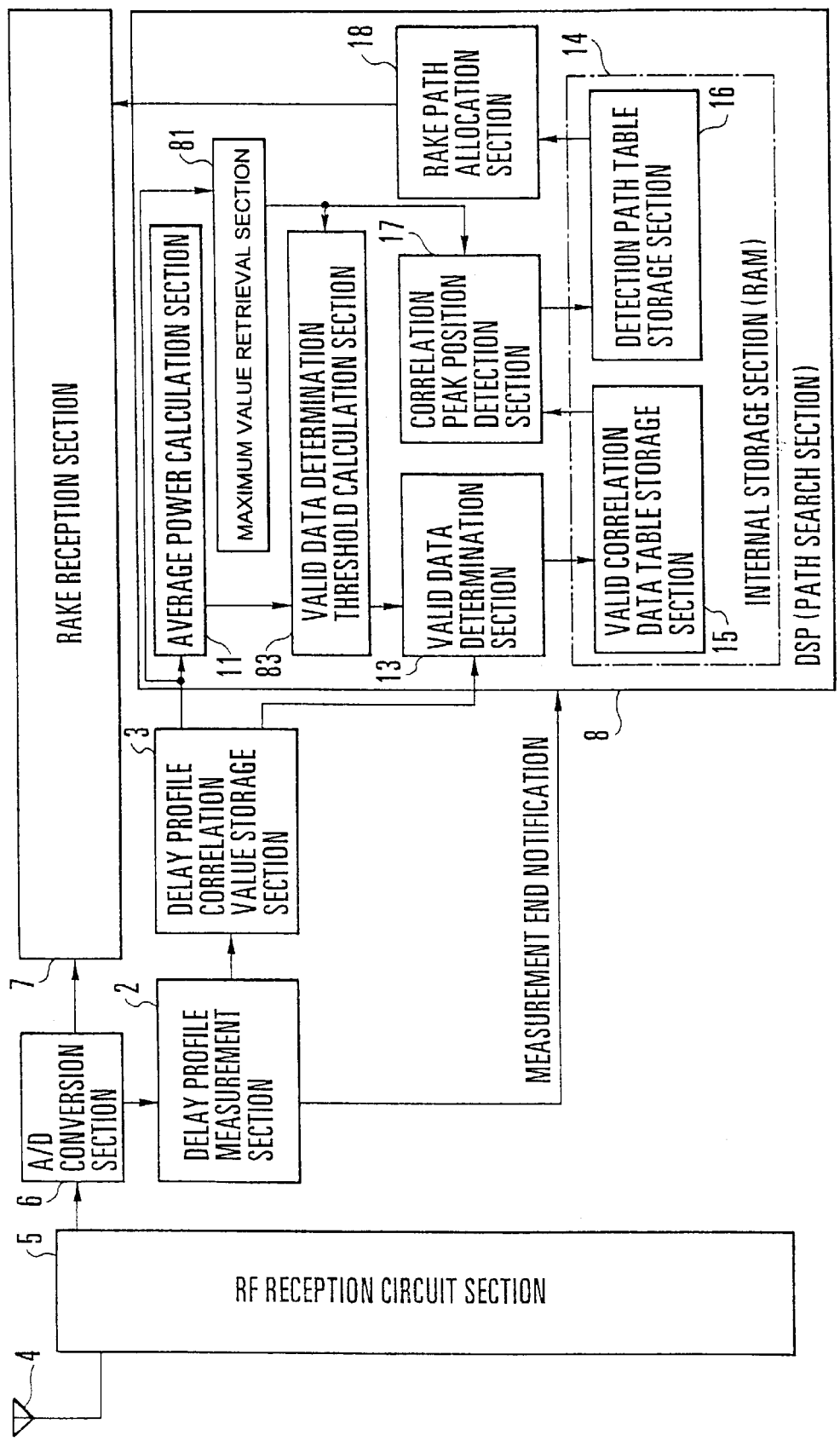
FIG. 12 is a block diagram showing the arrangement of a Rake receiver according to the third embodiment of the present invention.

FIG. 12 shows the arrangement of a Rake receiver according to the third embodiment of the present invention. The same reference numerals as in FIG. 1 and 8 denote the same parts in FIG. 12. The Rake receiver according to the third embodiment has same arrangement as that of the Rake receiver according to the second embodiment of the present invention except that a DSP 8 additionally includes a valid data determination threshold calculation section 83 for checking, on the basis of the calculation result obtained by an average power calculation section 11 and the retrieval result obtained by a maximum value retrieval section 81, whether the correlation data of a delay profile is the data of a valid path. The operations of the same constituent elements as those of the Rake receiver according to the first embodiment of the present invention are the same as those thereof.

The maximum value retrieval section 81 retrieves the maximum value of the correlation data loaded from a delay profile correlation value storage section 3 before a valid data determination section 13 performs validity determination. The valid data determination threshold calculation section 83 multiplies the average power calculated by the average power calculation section 11 by a predetermined value to absorb the variance of interference wave levels (portions having no correlation peaks), thereby obtaining a valid data determination threshold a. The valid data determination threshold calculation section 83 sets the value obtained by multiplying the maximum peak value retrieved by the maximum value retrieval section 81 by X (X is a predetermined ratio, e.g., 6 dB) as a valid data determination threshold b. The valid data determination section 13 can improve the validity determination precision by determining only data equal to or larger than these valid data determination threshold a or b as valid data. In this case, the valid data determination threshold calculation section 83 can calculate a valid data determination threshold by adding/subtracting the value X to/from the maximum peak value or dividing it by the value X like the valid data determination threshold calculation section 12 in FIG. 1.

Figure 13:
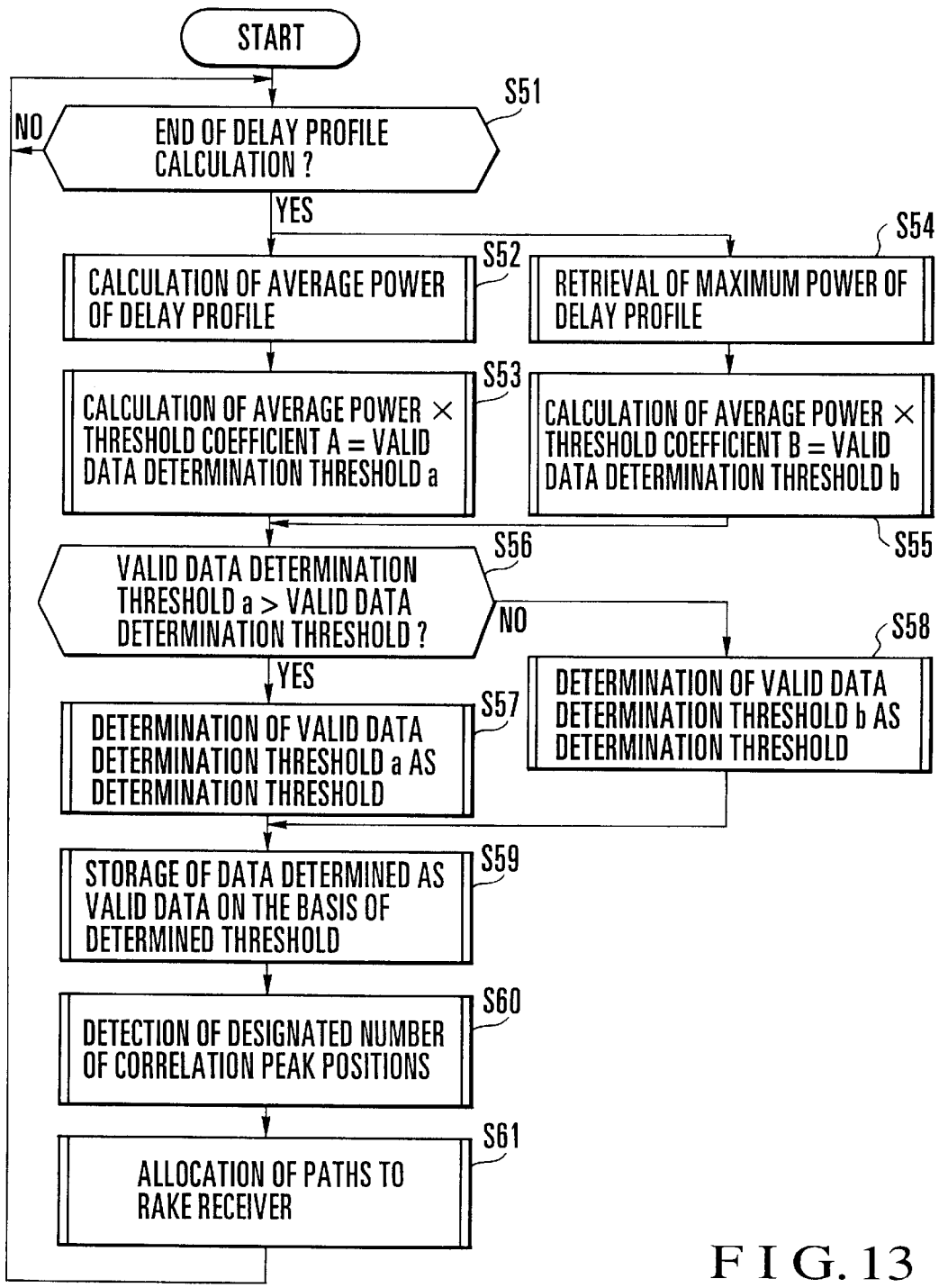
FIG. 13 is a flow chart showing the operation of a DSP in FIG. 12.

FIG. 13 shows the processing performed by the DSP 8 in FIG. 12. The path search processing performed by the Rake receiver according to the second embodiment of the present invention will be described with reference to FIGS. 12 and 13. The processing shown in FIG. 13 can be implemented when the DSP 8 executes the programs stored in a control memory. The control memory may be set in an internal storage section 14. Alternatively, a ROM, floppy disk, or the like may be used.

First of all, upon reception of a signal indicating the end of delay profile calculation from a delay profile measurement section 2 (step S51 in FIG. 13), the average power calculation section 11 of the DSP 8 calculates an average delay profile power (step S52 in FIG. 13). The valid data determination threshold calculation section 83 performs calculation (multiplication) for the average power obtained by the average power calculation section 11 using a predetermined threshold coefficient (constant) to calculate the valid data determination threshold a (step S53 in FIG. 13).

Concurrently with this processing, the maximum value retrieval section 81 of the DSP 8 retrieves the maximum value of the correlation data loaded from the delay profile correlation value storage section 3 before the valid data determination section 13 performs validity determination (step S54 in FIG. 13). The valid data determination threshold calculation section 83 performs calculation (multiplication) for the maximum value retrieved by the maximum value retrieval section 81 using a predetermined threshold coefficient (constant) to calculate the valid data determination threshold b (step S55 in FIG. 13).

The valid data determination threshold calculation section 83 compares the calculated valid data determination thresholds a and b with each other. If valid data determination threshold a>valid data determination threshold b (step S56 in FIG. 13), the valid data determination threshold calculation section 83 determines the valid data determination threshold a as the final valid data determination threshold (step S57 in FIG. 13). If valid data determination threshold a<valid data determination threshold b (step S56 in FIG. 13), the valid data determination threshold calculation section 83 determines the valid data determination threshold b as the final valid data determination threshold (step S58 in FIG. 13).

The valid data determination section 13 extracts data equal to or larger than the valid data determination threshold calculated by the valid data determination threshold calculation section 83 from the delay profile data, and stores the values and positions of the valid data in a valid correlation data table storage section 15 (step S59 in FIG. 13).

The correlation peak position detection section 17 detects a predetermined number of correlation peaks from the data stored in the valid correlation data table storage section 15, and stores the magnitudes and positions of the corresponding paths in a detected path table storage section 16 (step S60 in FIG. 13).

Finally, a Rake path allocation section 18 designates the detected paths to the Rake reception section 7 (step S61 in FIG. 13). Subsequently, the DSP 8 waits until a measurement end signal is received from the delay profile measurement section 2, and repeatedly performs the same processing as described above. Note that the maximum peak value retrieved by the maximum value retrieval section 81 is also used in the correlation peak position detection processing performed by the correlation peak position detection section 17.

The third embodiment of the present invention can properly cope with both the case wherein no noticeable peaks appear in a delay profile, as shown in FIG. 10, i.e., only data like noise is measured, and the case wherein noticeable peaks appear in a delay profile, as shown in FIG. 11, i.e., data in which peaks having larger correlation values appear is measured.

Fourth Embodiment

Figure 14:
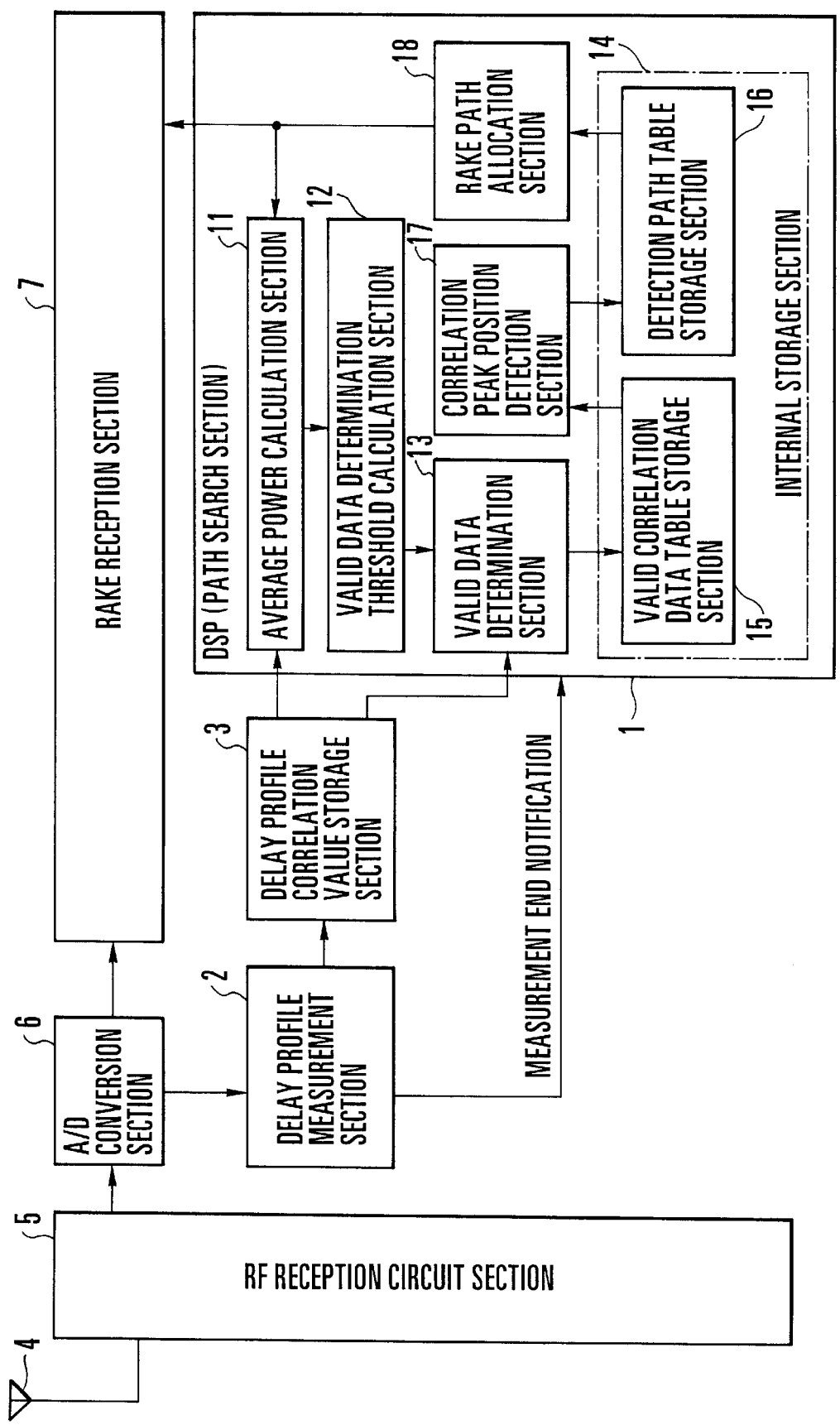
FIG. 14 is a block diagram showing the arrangement of a Rake receiver according to the fourth embodiment of the present invention.

FIG. 14 shows the arrangement of a Rake receiver according to the fourth embodiment of the present invention. The same reference numerals as in FIG. 1 denote the same parts in FIG. 14. The Rake receiver according to the fourth embodiment of the present invention has the same arrangement as that of the Rake receiver according to the first embodiment of the present invention in FIG. 1 except that the allocation result obtained by a Rake path allocation section 18 is input to an average power calculation section 11 in a DSP 1. The operations of the same constituent elements as those of the Rake receiver according to the first embodiment of the present invention are the same as those thereof.

When correlation data at X despreading timings (delay times: abscissa) are sampled, the average power calculation section 11 subtracts the correlation data of the paths designed by the Rake path allocation section 18 from the sum total of the correlation data at times 1 to X, and divides the resultant value by "sample count X —designated path count".

With this operation, the average power calculation section 11 can obtain the average value of almost only noise components. If, therefore, a valid data determination threshold calculation section 12 calculates a valid data determination threshold on the basis of this average value, the valid data determination threshold precision can be improved. This makes it possible to detect paths that have been missed.

FIG. 15 shows the processing performed by the DSP 1 in FIG. 14. The path search processing performed by the Rake receiver according to the fourth embodiment of the present invention will be described with reference to FIGS. 14 and 15. The processing in FIG. 15 is implemented when the DSP 1 executes the programs stored in a control memory. The control memory may be set in the internal storage section 14. Alternatively, a ROM, floppy disk, or the like may be used.

First of all, upon reception of a signal indicating the end of delay profile calculation from a delay profile measurement section 2 (step S71 in FIG. 15), the average power calculation section 11 of the DSP 1 calculates the power value of a delay profile within a predetermined range, and compares the power value with a stored power value (calculated in advance) (step S72 in FIG. 15). If the difference between the currently calculated power value and the stored power value falls outside an allowable range (step S73 in FIG. 15), the average power calculation section 11 continuously calculates the average power of the delay profile (step S74 in FIG. 15). The valid data determination threshold calculation section 12 performs calculation (multiplication) for the average power obtained by the average power calculation section 11 using a predetermined threshold coefficient (constant) to calculate a valid data determination threshold (step S75 in FIG. 15).

A valid data determination section 13 extracts data equal to or larger than the valid data determination threshold calculated by the valid data determination threshold calculation section 12 from the delay profile data, and stores the values and positions of the valid data in a valid correlation data table storage section 15 (step S76 in FIG. 15).

A correlation peak position detection section 17 detects a predetermined number of correlation peaks from the data stored in the valid correlation data table storage section 15, and stores the magnitudes and positions of the corresponding paths in a detected path table storage section 16 (step S78 in FIG. 15).

The Rake path allocation section 18 designates the detected paths to a Rake reception section 7 (step S79 in FIG. 15). Since the information of each path designated by the Rake path allocation section 18 is input to the average power calculation section 11, if a new threshold is calculated in the current processing (step S80 in FIG. 15), the correlation data of the path designated by the Rake path allocation section 18 is subtracted from the correlation data of all the addition results, and the resultant value is divided by "sample count—designated path count", thereby calculating an average value excluding the peak values of the allocated paths.

The valid data determination threshold calculation section 12 performs calculation (multiplication) for the average power obtained by the average power calculation section 11 using a predetermined threshold coefficient (constant) to calculate a valid data determination threshold (step S81 in FIG. 15). The valid data determination threshold calculation section 12 then stores the calculated valid data determination threshold (step S82 in FIG. 15).

If the difference between the currently calculated power value and a stored power value falls within an allowable range (step S73 in FIG. 15), the average power calculation section 11 interrupts calculation of the average power of a delay profile, and notifies the valid data determination threshold calculation section 12 that the valid data determination threshold used in the previous processing can be used. Upon reception of this notification, the valid data determination threshold calculation section 12 transmits the stored valid data determination threshold to the valid data determination section 13.

The valid data determination section 13 extracts data equal to or larger than the valid data determination threshold stored in the valid data determination threshold calculation section 12, and stores the values and positions of the valid data in the valid correlation data table storage section 15 (step S77 in FIG. 15).

The correlation peak position detection section 17 detects a predetermined number of correlation peaks from the data stored in the valid correlation data table storage section 15, and stores the magnitudes and positions of the corresponding paths in the detected path table storage section 16 (step S78 in FIG. 15).

The Rake path allocation section 18 designates the detected paths to the Rake reception section 7 (step S79 in FIG. 15). Subsequently, the DSP 1 waits until a measurement end signal is received from the delay profile measurement section 2, and repeatedly performs the same processing as described above.

As described above, according to the fourth embodiment, when it is detected that a given state has continued under the same reception environment, the valid data determination threshold calculated by preceding processing, the processing time can be shortened. At this time, by stopping the supply of power to the delay profile measurement section 2 or the like, power can be saved.

Fifth Embodiment

Figure 16:
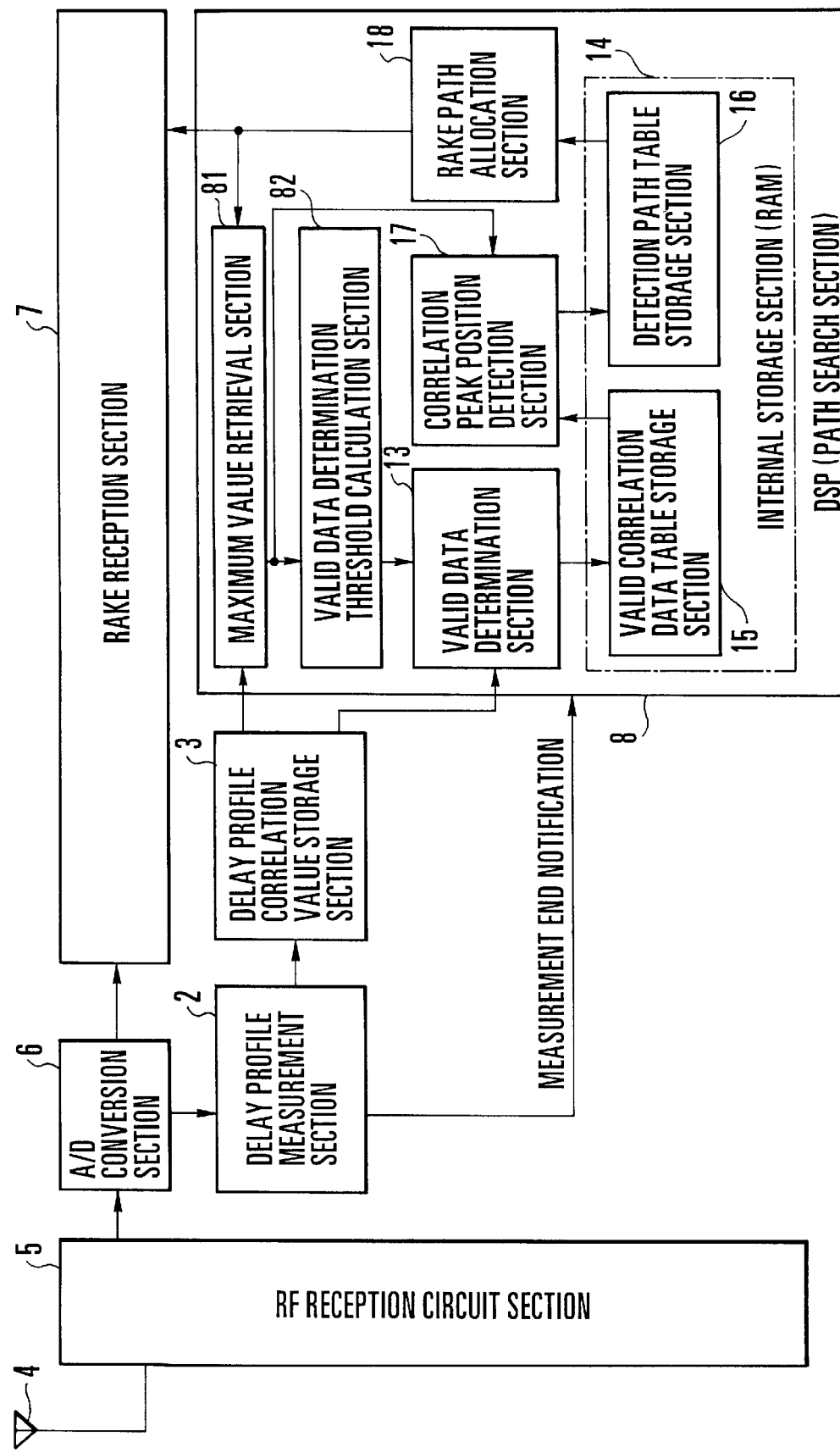
FIG. 16 is a block diagram showing the arrangement of a Rake receiver according to the fifth embodiment of the present invention.

FIG. 16 shows the arrangement of a Rake receiver according to the fifth embodiment of the present invention. The same reference numerals as in FIG. 8 denote the same parts in FIG. 16. The Rake receiver according to the fifth embodiment of the present invention has the same arrangement as that of the Rake receiver according to the second embodiment of the present invention except that the allocation result obtained by a Rake path allocation section 18 is input to a maximum value retrieval section 81 in a DSP 8. The operations of the same constituent elements as those of the Rake receiver according to the second embodiment of the present invention are the same as those thereof.

Upon reception of the information of the paths designated by the Rake path allocation section 18, the maximum value retrieval section 81 calculates the power value of a delay profile within a predetermined range, and compares the calculated power value with a stored power value (previously calculated power value).

If the difference between the currently calculated power value and the stored power value falls outside an allowable range, the maximum value retrieval section 81 continues maximum value retrieval processing. If the difference falls within the allowable range, the maximum value retrieval section 81 interrupts the maximum value retrieval processing, and operates to extract valid data with the previously calculated valid data determination threshold.

FIG. 17 shows the processing performed by the DSP 8 in FIG. 16. The path search processing performed by the Rake receiver according to the fifth embodiment of the present invention will be described with reference to FIGS. 16 and 17. The processing in FIG. 17 is implemented when the DSP 8 executes the programs stored in a control memory. The control memory may be set in the internal storage section 14. Alternatively, a ROM, floppy disk, or the like may be used.

First of all, upon reception of a signal indicating the end of delay profile calculation from a delay profile measurement section 2 (step S91 in FIG. 17), the maximum value retrieval section 81 of the DSP 8 calculates the power value of a delay profile within a predetermined range, and compares the calculated power value with a stored power value (previously calculated power value) (step S92 in FIG. 17).

If the difference between the currently calculated power value and the stored power value falls outside a predetermined allowable range (step S93 in FIG. 17), the maximum value retrieval section 81 continuously retrieves the maximum value of the correlation data loaded from the delay profile correlation value storage section 3 before a valid data determination section 13 performs validity determination (step S94 in FIG. 17).

A valid data determination threshold calculation section 82 performs calculation (multiplication) for the maximum value retrieved by the maximum value retrieval section 81 using a predetermined threshold coefficient (constant) to calculate a valid data determination threshold (step S95 in FIG. 17).

The valid data determination section 13 extracts data equal to or larger than the valid data determination threshold calculated by the valid data determination threshold calculation section 82 from the delay profile data, and stores the values and positions of the valid data in a valid correlation data table storage section 15 (step S96 in FIG. 17).

A correlation peak position detection section 17 detects a predetermined number of correlation peaks from the data stored in the valid correlation data table storage section 15, and stores the magnitudes and positions of the corresponding paths in a detected path table storage section 16 (step S98 in FIG. 17).

The Rake path allocation section 18 designates the detected paths to the Rake reception section 7 (step S99 in FIG. 17). Since the information of each path designated by the Rake path allocation section 18 is input to the maximum value retrieval section 81 at this time, if a new threshold is calculated by this processing (step S100 in FIG. 17), the valid data determination threshold calculated by the valid data determination threshold calculation section 82 is stored (step S101 in FIG. 17).

If the difference between the currently calculated power value and the stored power value falls within a predetermined allowable range (step S93 in FIG. 17), the maximum value retrieval section 81 interrupts the retrieval of the maximum value of the delay profile, and notifies the valid data determination threshold calculation section 82 that the valid data determination threshold used in the previous processing can be used. Upon reception of this notification, the valid data determination threshold calculation section 82 sends the stored valid data determination threshold to the valid data determination section 13.

The valid data determination section 13 extracts data equal to or larger than the valid data determination threshold stored in the valid data determination threshold calculation section 82 from the delay profile data, and stores the values and positions of the valid data in the valid correlation data table storage section 15 (step S97 in FIG. 17).

The correlation peak position detection section 17 detects a predetermined number of correlation peaks from the data stored in the valid correlation data table storage section 15, and stores the magnitudes and positions of the corresponding paths in the detected path table storage section 16 (step S98 in FIG. 17).

The Rake path allocation section 18 designates the detected paths to the Rake reception section 7 (step S99 in FIG. 17). Subsequently, the DSP 8 waits until a measurement end signal is received from the delay profile measurement section 2, and repeatedly performs the same processing as described above.

As described above, according to the fifth embodiment of the present invention, when a reception environment remains unchanged, the valid data determination threshold calculated by the previous processing is used. This can shorten the processing time. In this case, by stopping the supply of power to the delay profile measurement section 2, power can be saved.

Sixth Embodiment

Figure 18:
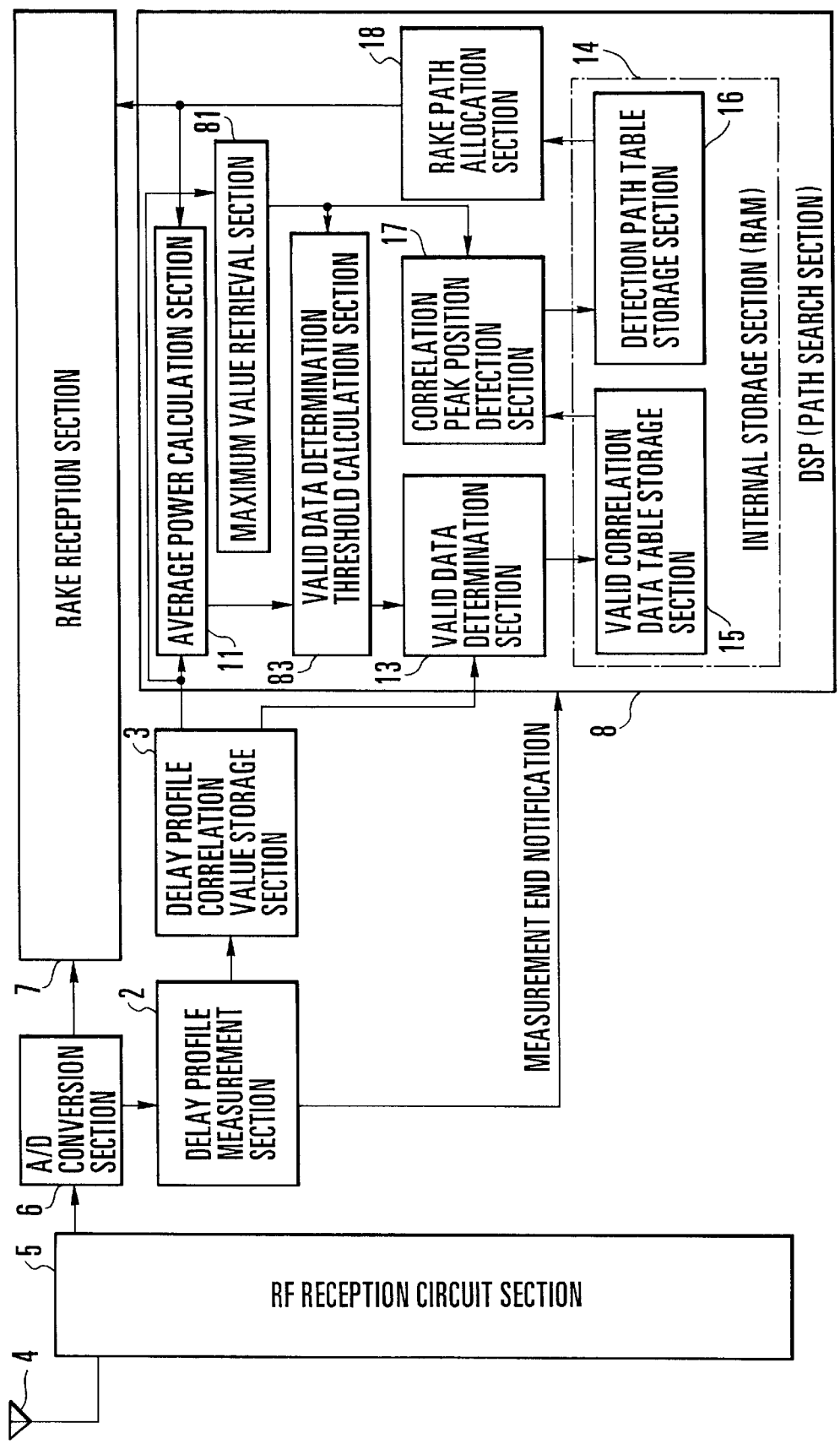
FIG. 18 is a block diagram showing the arrangement of a Rake receiver according to the sixth embodiment of the present invention.

FIG. 18 shows the arrangement of a Rake receiver according to the sixth embodiment of the present invention. The same reference numerals as in FIG. 12 denote the same parts in FIG. 18. The arrangement of the Rake receiver according to the sixth embodiment of the present invention is the same as that of the Rake receiver according to the third embodiment of the present invention except that the allocation result obtained by a Rake path allocation section 18 is input to an average power calculation section 11 in a DSP 8. The operations of the same constituent elements as those of the Rake receiver according to the third embodiment of the present invention are the same as those thereof.

When correlation data at X despreading timings (delay times: abscissa) are sampled, the average power calculation section 11 subtracts the correlation data of the paths designed by the Rake path allocation section 18 from the sum total of the correlation data at times 1 to X, and divides the resultant value by "sample count X —designated path count".

With this operation, the average power calculation section 11 can obtain the average value of almost only noise components. If, therefore, a valid data determination threshold calculation section 12 calculates a valid data determination threshold on the basis of this average value, the valid data determination threshold precision can be improved. This makes it possible to detect paths that have been missed.

Figure 19:
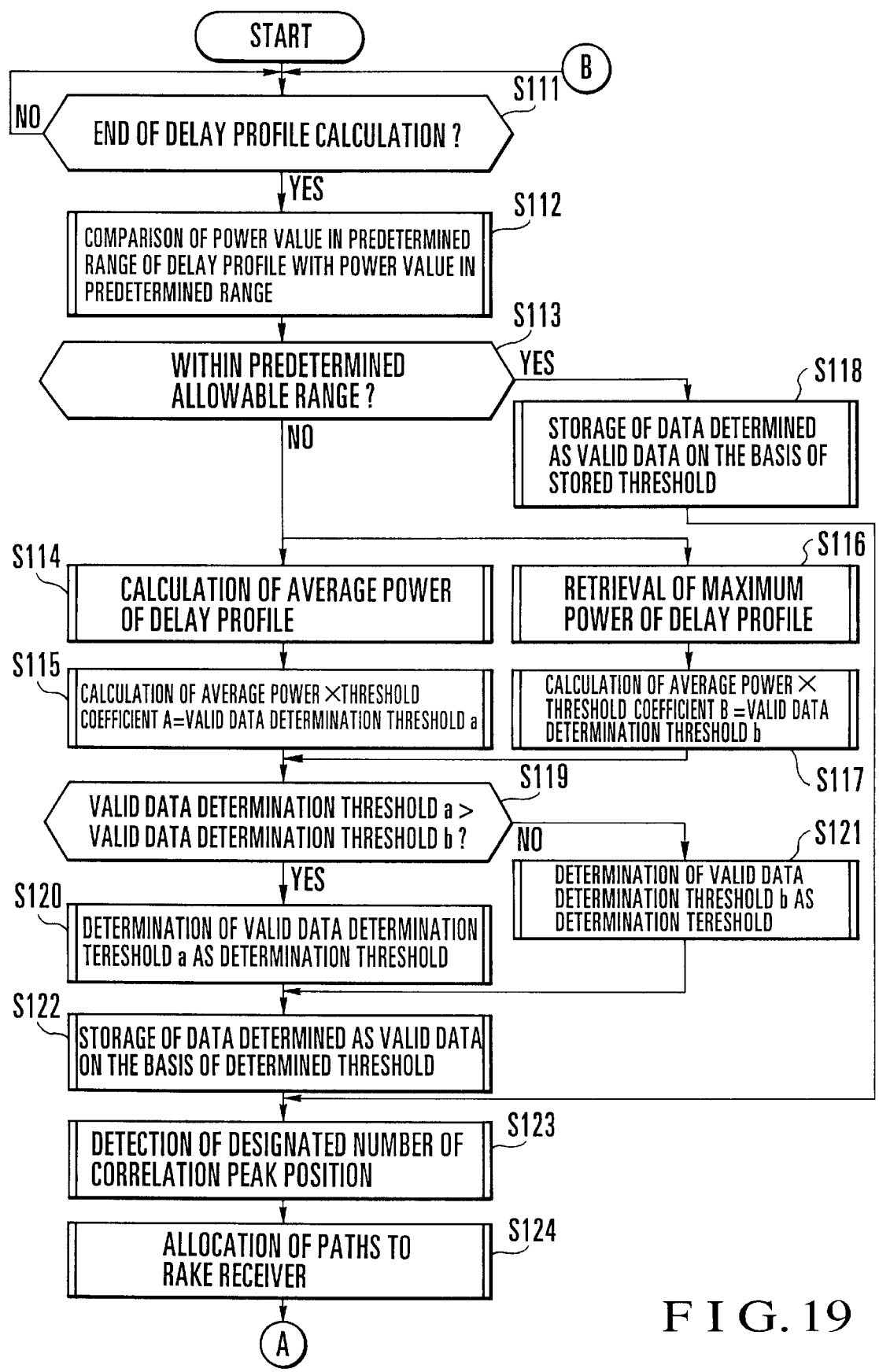
FIG. 19 is a flow chart showing the operation of a DSP in FIG. 18.
Figure 20:
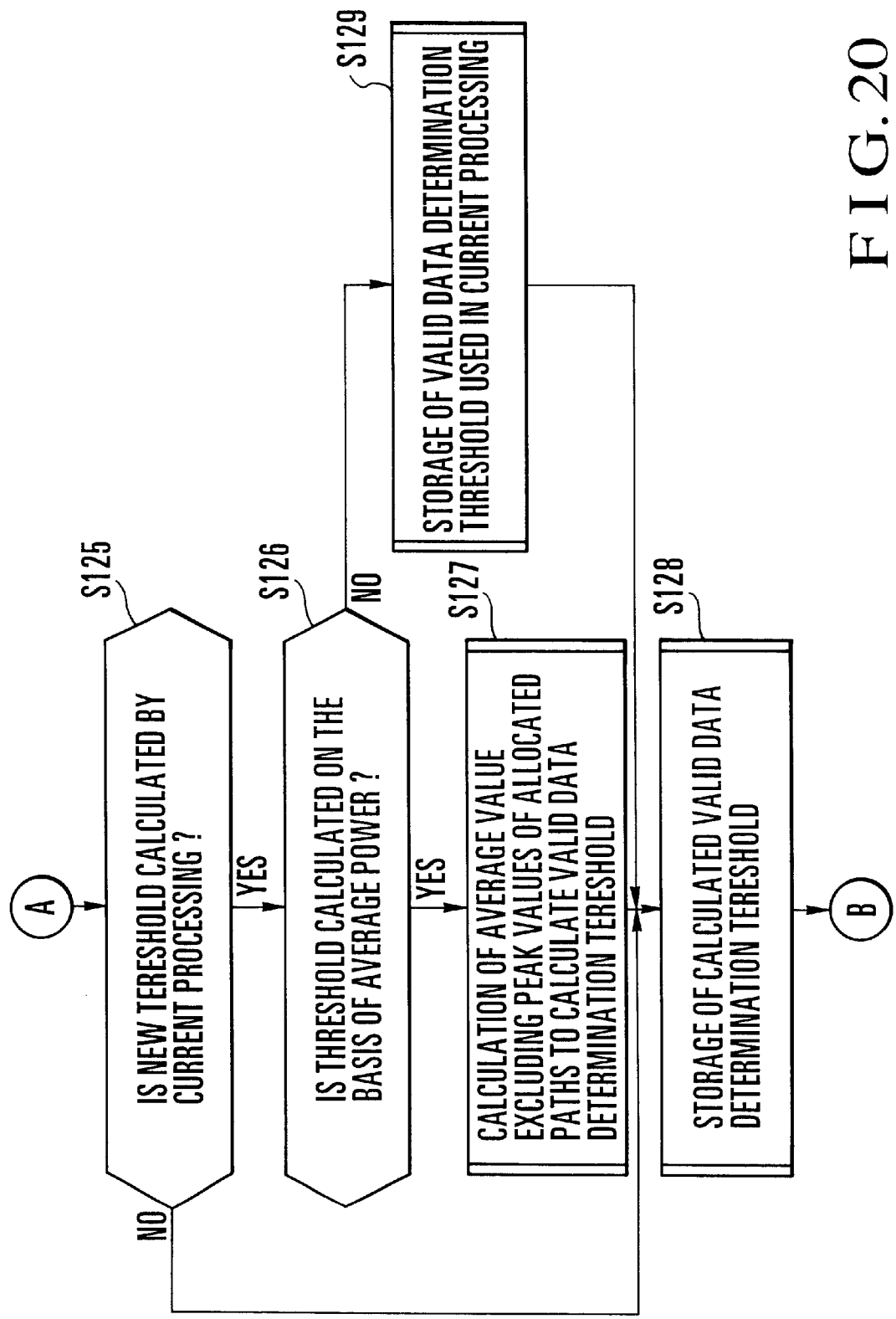
FIG. 20 is a flow chart showing the operation of the DSP in FIG. 18.

FIGS. 19 and 20 show the processing performed by the DSP 8 in FIG. 18. The path search processing performed by the Rake receiver according to the sixth embodiment of the present invention will be described with reference to FIGS. 18 and 20. The processing in FIGS. 19 and 20 is implemented when the DSP 1 executes the programs stored in a control memory. The control memory may be set in the internal storage section 14. Alternatively, a ROM, floppy disk, or the like may be used.

First of all, upon reception of a signal indicating the end of delay profile calculation from a delay profile measurement section 2 (step S111 in FIG. 19), the average power calculation section 11 of the DSP 1 calculates the power value of a delay profile within a predetermined range, and compares the power value with a stored power value (calculated in advance) (step S112 in FIG. 19).

If the difference between the currently calculated power value and the stored power value falls outside an allowable range (step S113 in FIG. 19), the average power calculation section 11 continuously calculates the average power of the delay profile (step S114 in FIG. 19). A valid data determination threshold calculation section 83 performs calculation (multiplication) for the average power obtained by the average power calculation section 11 using a predetermined threshold coefficient (constant) to calculate a valid data determination threshold a (step S115 in FIG. 19).

Concurrently with this processing, a maximum value retrieval section 81 of the DSP 8 retrieves the maximum value of the correlation data loaded from a delay profile correlation value storage section 3 before a valid data determination section 13 performs validity determination (step S116 in FIG. 19). The valid data determination threshold calculation section 83 performs calculation (multiplication) for the maximum value retrieved by the maximum value retrieval section 81 using a predetermined threshold coefficient (constant) to calculate a valid data determination threshold b (step S117 in FIG. 19).

The valid data determination threshold calculation section 83 compares the calculated valid data determination thresholds a and b with each other. If valid data determination threshold a>valid data determination threshold b (step S119 in FIG. 19), the valid data determination threshold calculation section 83 determines the valid data determination threshold a as the final valid data determination threshold (step S120 in FIG. 19). If valid data determination threshold a<valid data determination threshold b (step S119 in FIG. 19), the valid data determination threshold calculation section 83 determines the valid data determination threshold b as the final valid data determination threshold (step S121 in FIG. 19).

The valid data determination section 13 extracts data equal to or larger than the valid data determination threshold calculated by the valid data determination threshold calculation section 83 from the delay profile data, and stores the values and positions of the valid data in a valid correlation data table storage section 15 (step S122 in FIG. 19).

A correlation peak position detection section 17 detects a predetermined number of correlation peaks from the data stored in the valid correlation data table storage section 15, and stores the magnitudes and positions of the corresponding paths in a detected path table storage section 16 (step S123 in FIG. 19).

The Rake path allocation section 18 designates the detected paths to a Rake reception section 7 (step S124 in FIG. 19). Since the information of each path designated by the Rake path allocation section 18 is input to the average power calculation section 11, if a new threshold is calculated by the current processing (step S125 in FIG. 20) and the new threshold is calculated on the basis of the average power (step S126 in FIG. 20), the correlation data of the paths designated by the Rake path allocation section 18 are subtracted from the sum total of all the correlation data calculated by the above processing, and the resultant value is divided by "sample count—designated path count", thereby calculating an average value excluding the peak values of the allocated paths.

The valid data determination threshold calculation section 83 performs calculation (multiplication) for the average power obtained by the average power calculation section 11 using a predetermined threshold coefficient (constant) to calculate a valid data determination threshold (step S127 in FIG. 20), and stores the calculated valid data determination threshold (step S128 in FIG. 20).

In contrast to this, if a new threshold is calculated by the current processing (step S125 in FIG. 20) and the new threshold is not calculated on the basis of the average power (step S126 in FIG. 20), i.e., if the threshold is obtained on the basis of the retrieval result obtained by the maximum value retrieval section 81, the threshold (used in the current processing) is stored (step S129 in FIG. 20).

If the difference between the currently calculated power value and the stored power value falls within a predetermined allowable range (step S113 in FIG. 19), the average power calculation section 11 interrupts the calculation of the average power of the delay profile and retrieval of the maximum value of the delay profile, and notifies the valid data determination threshold calculation section 83 that the valid data determination threshold used in the previous processing can be used. Upon reception of this notification, the valid data determination threshold calculation section 83 sends the stored valid data determination threshold to the valid data determination section 13.

The valid data determination section 13 extracts data equal to or larger than the valid data determination threshold stored in the valid data determination threshold calculation section 83 from the delay profile data, and stores the values and positions of the valid data in the valid correlation data table storage section 15 (step S118 in FIG. 19).

The correlation peak position detection section 17 detects a predetermined number of correlation peaks from the data stored in the valid correlation data table storage section 15, and stores the magnitudes and positions of the corresponding paths in a detected path table storage section 16 (step S123 in FIG. 19).

The Rake path allocation section 18 designates the detected paths to the Rake reception section 7 (step S124 in FIG. 19). Subsequently, the DSP 8 waits until a measurement end signal is received from the delay profile measurement section 2, and repeatedly performs the same processing as described above.

As described above, according to the sixth embodiment of the present invention, when a reception environment remains unchanged, the valid data determination threshold calculated by the previous processing is used. This can shorten the processing time. In this case, by stopping the supply of power to the delay profile measurement section 2, power can be saved.

FIG. 21 explains follow-up operation for changes in path delay time in the present invention. Referring to FIG. 21, assume a finger is allocated to a delay profile correlation peak position (this operation changes depending on the path allocation algorithm to be used). In this case, if a valid path is detected in the next update operation near the timing (within about one chip) at which the finger has been allocated, the path allocated to the finger is regarded as a valid path, and the timing is updated to the position at which the path is detected. This can improve the follow-up characteristics with respect to changes in path delay time.

In this manner, the valid data determination threshold calculation section 12 or 83 calculates a valid data determination threshold for determining the validity of the correlation data of a delay profile on the basis of the calculation result obtained by the average power calculation section 11, or the valid data determination threshold calculation section 82 or 83 calculates a valid data determination threshold for determining the validity of the correlation data of the delay profile on the basis of the retrieval result obtained by the maximum value retrieval section 81. The valid data determination section 13 then determines valid data of the delay profile file on the basis of the valid data determination threshold, thereby reducing the number of data to be calculated. This can greatly reduces the processing amounts in the DSPs (path search sections) 1 and 8.

Since the processing amount in the DSPs 1 and 8 can be reduced, the DSPs 1 and 8 can be operated at a low-frequency clock, and the current consumption can be reduced.

In addition, since reductions in the processing amounts in the DSPs 1 and 8 can shorten the calculation time, processing delays can be reduced. This makes it possible to improve the follow-up characteristics with respect to changes in path delay time, resulting in an improvement in path allocation characteristics.

Furthermore, the processing amounts in the DSPs 1 and 8 can be reduced, and the path search function can be incorporated in a speech codec DSP or communication control CPU. This can simplify the hardware arrangement.

For the sake of descriptive convenience, the arrangement and operation of each embodiment has been described above in relation to the processing for the reception signal from one base station. In general, however, a CDMA receiver processes reception signals from a plurality of base stations, and hence the above processing may be performed for each reception signal from each base station upon soft handover or the like. In this case, each circuit described above may be provided for each base station or may be shared among base stations.

What is claimed is:

1. A CDMA receiver comprising a Rake reception circuit operative to perform in—phase synthesis of reception signals from a plurality of paths, wherein a delay profile indicating a signal power distribution with respect to delay times of the reception signals is measured, an interference wave power value is estimated on the basis of the measured delay profile, valid data are extracted from the delay profile on the basis of the estimated interference wave power value, a plurality of correlation peak positions are detected from the extracted valid data, and path allocation to said Rake reception circuit is determined on the basis of the correlation peak positions, wherein a change in a reception environment for reception signals is detected every time the reception signal is input, and valid data are extracted from the delay profile on the basis of the interference wave power value used in previous processing when it is detected that the reception environment remains unchanged.

2. A receiver according to claim 1, wherein the valid data are extracted by comparing the delay profile with the interference wave power value.

3. A receiver according to claim 1, wherein the interference wave power value is estimated by calculating an average power of the delay profile, and performing calculation for the calculated average power using a predetermined coefficient.

4. A receiver according to claim 3, wherein the coefficient is predetermined such that all interference wave power components of the delay profile which have small correlation values have values less than the interference wave power value.

5. A receiver according to claim 3, wherein the average power of the delay profile is calculated excluding delay profile data corresponding to a path allocated to said Rake reception circuit.

6. A receiver according to claim 3, wherein maximum value retrieval is performed for the delay profile before extraction of the valid data in estimating the interference wave power value, and the valid data are extracted from the delay profile on the basis of at least one of the interference wave power value and a retrieval result of the maximum value retrieval.

7. A receiver according claim 1, wherein the plurality of correlation peak positions of the extracted valid data are detected by comparing said data from the delay profile to a maximum peak value and whereby if said data is equal to or larger than said maximum peak value then the maximum peak value is replaced with the data from the delay profile.

8. A CDMA receiver comprising a Rake reception circuit operative to perform in—phase synthesis of reception signals from a plurality of paths, wherein a delay profile indicating a signal power distribution with respect to delay times of the reception signals is measured, an average power value of the measured delay profile is calculated, valid data are extracted from the delay profile on the basis of the calculated average power value, a plurality of correlation peak positions are detected from the extracted valid data, and path allocation to said Rake reception circuit is determined on the basis of the correlation peak positions, wherein a change in a reception environment for reception signals is detected every time the reception signal is input, and valid data are extracted from the delay profile on the basis of the average power value used in previous processing when it is detected that the reception environment remains unchanged.

9. A receiver according to claim 8, wherein the valid data are extracted by comparing the delay profile with the average power value.

10. A receiver according to claim 8, wherein the average power of the delay profile is calculated excluding delay profile data corresponding to a path allocated to said Rake reception circuit.

11. A receiver according claim 8, wherein the plurality of correlation peak positions of the extracted valid data are detected by comparing said data from the delay profile to a maximum peak value and whereby if said data is equal to or larger than said maximum peak value then the maximum peak value is replaced with the data from the delay profile.

12. A CDMA receiver comprising:
  a Rake reception circuit for performing in-phase synthesis of reception signals from a plurality of paths;
  delay profile measurement means for measuring a delay profile indicating a signal power distribution with respect to delay times of the reception signals;
  estimation means for estimating an interference wave power value on the basis of the delay profile measured by said delay profile measurement means;

valid data determination means for extracting valid data from the delay profile measured by said delay profile measurement means on the basis of the interference wave power value estimated by said estimation means;

correlation peak detection means for detecting a plurality of correlation peak positions from the valid data extracted by said valid data determination means; and Rake path allocation means for determining path allocation to said Rake reception circuit on the basis of the correlation peak positions detected by said correlation peak position detection means, wherein said receiver further comprises means for detecting a change in a reception environment for reception signals every time the reception signal is input, and extracts valid data from the delay profile on the basis of the interference wave power value used in previous processing when it is detected that the reception environment remains unchanged.

13. A receiver according to claim 12, wherein said valid data determination means extracts the valid data by comparing the delay profile measured by said delay profile measurement means with the interference wave power value estimated by said estimation means.

14. A receiver according to claim 12, wherein said estimation means comprises average power calculation means for calculating an average power of the delay profile measured by said delay profile measurement means, and means for estimating the interference wave power value by performing using a coefficient calculation for the average power calculated by said average power calculation means.

15. A receiver according to claim 14, wherein the coefficient is predetermined such that all interference wave power components of the delay profile which have small correlation values have values less than the interference wave power value.

16. A receiver according to claim 14, wherein the average power of the delay profile is calculated excluding delay profile data corresponding to a path allocated to said Rake reception circuit.

17. A receiver according to claim 12, further comprising valid data storage means for storing the valid data extracted by said valid data determination means, and detected path storage means for storing the plurality of correlation peak positions detected by said correlation peak position detection means.

18. A receiver according to claim 14, wherein said estimation means comprises maximum value retrieval means for retrieving a maximum value of the delay profile measured by said delay profile measurement means before said valid data determination means performs validity determination, and said valid data determination means extracts the valid data from the delay profile measured by said delay profile measurement means, on the basis of at least one of the interference wave power value and a retrieval result obtained by said maximum value retrieval means.

19. A receiver according to claim 12, wherein said correlation peak position detection means compares said data from the delay profile to a maximum peak value and whereby if said data is equal to or larger than said maximum peak value, said correlation peak position detection means replaces the maximum peak value with the data from the delay profile.

20. A CDMA receiver comprising:

a Rake reception circuit for performing in—phase synthesis of reception signals from a plurality of paths;

delay profile measurement means for measuring a delay profile indicating a signal power distribution with respect to delay times of the reception signals;

calculation means for calculating an average power value of the delay profile measured by said delay profile measurement means;

valid data determination means for extracting valid data from the delay profile measured by said delay profile measurement means on the basis of the average power value calculated by said calculation means;

correlation peak detection means for detecting a plurality of correlation peak positions from the valid data extracted by said valid data determination means; and Rake path allocation means for determining path allocation to said Rake reception circuit on the basis of the correlation peak positions detected by said correlation peak position detection means, wherein said receiver further comprises means for detecting a change in a reception environment for reception signals every time the reception signal is input, and extracts valid data from the delay profile on the basis of the average power value used in previous processing when it is detected that the reception environment remains unchanged.

21. A receiver according to claim 20, wherein said valid data determination means extracts the valid data by comparing the delay profile with the average power value.

22. A receiver according to claim 20, wherein the average power of the delay profile is calculated excluding delay profile data corresponding to a path allocated to said Rake reception circuit.

23. A receiver according to claim 20, wherein said correlation peak position detection means compares said data from the delay profile to a maximum peak value and whereby if said data is equal to or larger than said maximum peak value, said correlation peak position detection means replaces the maximum peak value with the data from the delay profile.

24. A path detection method for a CDMA receiver including a Rake reception circuit for performing in-phase synthesis of reception signals from a plurality of paths, comprising the steps of measuring a delay profile indicating a signal power distribution with respect to delay times of the reception signals, estimating an interference wave power value on the basis of the measured delay profile, extracting valid data from the delay profile on the basis of the estimated interference wave power value, detecting a plurality of correlation peak positions from the extracted valid data, and determining path allocation to said Rake reception circuit on the basis of the detected correlation peak positions, further comprising the step of detecting a change in a reception environment for reception signals every time the reception signal is input, and the step of extracting valid data from the delay profile on the basis of the interference wave power value used in previous processing when it is detected that the reception environment remains unchanged.

25. A method according to claim 24, wherein the step of extracting the valid data comprises extracting the valid data by comparing the delay profile with the interference wave power value.

26. A method according to claim 24, wherein the step of estimating the interference wave power value comprises the step of calculating an average power of the measured delay profile, and the step of estimating the interference wave power value by performing calculation for the calculated average power using a predetermined coefficient.

27. A method according to claim 26, wherein the coefficient is predetermined such that all interference wave power components of the delay profile which have small correlation values have values less than the interference wave power value.

28. A method according to claim 24, further comprising the step of storing the extracted valid data, and the step of storing the detected correlation peak positions.

29. A method according to claim 24, further comprising the step of calculating an average power of the delay profile excluding delay profile data corresponding to a path allocated to said Rake reception circuit.

30. A method according to claim 24, wherein the step of estimating the interference wave power value comprises the step of performing maximum value retrieval with respect to the measured delay profile before the valid data are extracted, the valid data being extracted from the measured delay profile on the basis of at least one of the interference wave power value and a result of the maximum value retrieval.

31. A method according to claim 24, wherein the step of detecting a plurality of correlation peak position from the extracted valid data comprises comparing said data from the delay profile to a maximum peak value and whereby if said data is equal to or larger than said maximum peak value is replaced with the data from the delay profile.

32. A path detection method for a CDMA receiver including a Rake reception circuit for performing in—phase synthesis of reception signals from a plurality of paths, comprising the steps of measuring a delay profile indicating a signal power distribution with respect to delay times of the reception signals, calculating an average power value of the measured delay profile, extracting valid data from the delay profile on the basis of the calculated average power value, detecting a plurality of correlation peak positions from the extracted valid data, and determining path allocation to said Rake reception circuit on the basis of the detected correlation peak positions, further comprising the step of detecting a change in a reception environment for reception signals every time the reception signal is input, and the step of extracting valid data from the delay profile on the basis of the average power value used in previous processing when it is detected that the reception environment remains unchanged.

33. A method according to claim 32, wherein the step of extracting the valid data comprises extracting the valid data by comparing the delay profile with the average power value.

34. A method according to claim 32, further comprising the step of calculating the average power of the delay profile excluding delay profile data corresponding to a path allocated to said Rake reception circuit.

35. A method according to claim 32, wherein the step of detecting a plurality of correlation peak position from the extracted valid data comprises comparing said data from the delay profile to a maximum peak value and whereby if said data is equal to or larger than said maximum peak value is replaced with the data from the delay profile.

36. A machine-readable recording medium which embodies a path detection control program for causing a computer to perform path detection in a CDMA receiver including a Rake reception circuit for performing in-phase synthesis of reception signals from a plurality of paths, the path detection control program causing the computer to measure a delay profile indicating a signal power distribution with respect to delay times of the reception signals, causing the computer to estimate an interference wave power value on the basis of the measured delay profile, causing the computer to extract valid data from the delay profile on the basis of the estimated interference wave power value, causing the computer to detect a plurality of correlation peak positions from the extracted valid data, and causing the computer to determine path allocation to said Rake reception circuit on the basis of the detected correlation peak positions, further comprising the step of detecting a change in a reception environment for reception signals every time the reception signal is input, and the step of extracting valid data from the delay profile on the basis of the interference wave power value used in previous processing when it is detected that the reception environment remains unchanged.

37. A machine-readable recording medium which embodies a path detection control program for causing a computer to perform path detection in a CDMA receiver including a Rake reception circuit for performing in-phase synthesis of reception signals from a plurality of paths, the path detection control program causing the computer to measure a delay profile indicating a signal power distribution with respect to delay times of the reception signals, causing the computer to calculate an average power value of the measured delay profile, causes the computer to extract valid data from the delay profile on the basis of the estimated average power value, causing the computer to detect a plurality of correlation peak positions from the extracted valid data, and causes the computer to determine path allocation to said Rake reception circuit on the basis of the detected correlation peak positions, further comprising the step of detecting a change in a reception environment for reception signals every time the reception signal is input, and the step of extracting valid data from the delay profile on the basis of the average power value used in previous processing when it is detected that the reception environment remains unchanged.

38. A CDMA receiver comprising a Rake reception circuit operative to perform in—phase synthesis of reception signals from a plurality of paths, wherein a delay profile indicating a signal power distribution with respect to delay times of the reception signals is measured, an average power value of the measured delay profile is calculated, a correlation threshold value is calculated, a maximum peak value threshold is calculated on the basis of a maximum peak value retrieved, valid data are determined and extracted from the delay profile on the basis of the calculated average power value, said correlation threshold value and said maximum peak value threshold, a plurality of correlation peak positions are detected from the extracted valid data, and path allocation to said Rake reception circuit is determined on the basis of the correlation peak positions, wherein a change in a reception environment for reception signals is detected every time the reception signal is input, and valid data are extracted from the delay profile on the basis of the average power value used in previous processing when it is detected that the reception environment remains unchanged.

39. A receiver according to claim 38, wherein the valid data are determined and extracted by comparing the delay profile with a valid data determination threshold by determining that only data equal to or larger than a valid data determination threshold is valid data.

40. A receiver according to claim 39, wherein the valid data determination threshold is the larger of either said correlation value threshold or said maximum value threshold.

41. A receiver according to claim 40, wherein the correlation threshold value is determined by multiplying said average power value of delay profile by a predetermined value to absorb a variance of interference wave levels.

42. A receiver according to claim 40, wherein the maximum peak value threshold is determined by multiplying said maximum peak value retrieved by a second predetermined value.

43. A receiver according to claim 38, wherein the maximum peak value retrieved is selected by maximum retrieval means.

44. A receiver according to claim 38, wherein the average power of the delay profile is calculated excluding delay profile data corresponding to a path allocated to said Rake reception circuit.

45. A receiver according to claim 38, wherein a plurality of correlation peak positions from the extracted valid data is detected by comparing said data from the delay profile to the maximum peak value and whereby if said data is equal to or larger than said maximum peak value then the maximum peak value is replaced with the data from the delay profile.

46. A receiver according to claim 45, wherein the maximum peak value retrieved is selected by a maximum retrieval means.

47. A CDMA receiver comprising:
a Rake reception circuit for performing in—phase synthesis of reception signals from a plurality of paths;
delay profile measurement means for measuring a delay profile indicating a signal power distribution with respect to delay times of the reception signals;
calculation means for calculating an average power value of the delay profile measured by said delay profile measurement means;
valid data determination threshold calculation means for determining a valid data determination threshold value, on the basis of said calculation result obtained by an average calculation means and a maximum peak value retrieved by a maximum value retrieval section, whether the correlation data of a delay profile is the data of a valid path;
valid data determination means for extracting valid data from the delay profile measured by said delay profile measurement means on the basis of the average power value calculated by said calculation means and said valid data determination threshold value;
correlation peak position detection means for detecting a plurality of correlation peak positions from the valid data extracted by said valid data determination means; and
Rake path allocation means for determining path allocation to said Rake reception circuit on the basis of the correlation peak positions detected by said correlation peak position detection means, wherein said receiver further comprises means for detecting a change in a reception environment for reception signals every time the reception signal is input, and extracts valid data from the delay profile on the basis of the average power value used in previous processing when it is detected that the reception environment remains unchanged.

48. A receiver according to claim 47, wherein said valid data determination means extracts the valid data by comparing the delay profile with the valid data determination threshold value by determining that only data equal to or larger than said valid data determination threshold is valid data.

49. A receiver according to claim 48, wherein the correlation threshold value is determined by multiplying said average power value of the correlation data by a predetermined value to absorb a variance of interference wave levels.

50. A receiver according to claim 47, where said valid data threshold value is the larger of either a correlation value threshold or a maximum peak value threshold.

51. A receiver according to claim 50, wherein the maximum peak value threshold is determined by multiplying the maximum peak value retrieved by a second predetermined value.

52. A receiver according to claim 47, wherein said correlation peak position detection means compares said data from the delay profile to the maximum peak value and whereby if said data is equal to or larger then said maximum peak value, said correlation peak position detection means replaces the maximum peak value with the data from the delay profile.

53. A method according to claim 52, wherein the maximum peak value retrieved is selected by a maximum retrieval means.

54. A path detection method for a CDMA receiver including a Rake reception circuit for performing in—phase synthesis of reception signals from a plurality of paths, comprising the steps of measuring a delay profile indicating a signal power distribution with respect to delay times of the reception signals, calculating an average power value of the measured delay profile, calculating a correlation value threshold, calculating a maximum peak value threshold based on a maximum peak value retrieved, determining and extracting from the delay profile on the basis of the calculated average power value, said correlation threshold value and said maximum peak value threshold valid data, detecting a plurality of correlation peak positions from the extracted valid data, and determining path allocation to said Rake reception circuit on the basis of the detected correlation peak positions, further comprising the step of detecting a change in a reception environment for reception signals every time the reception signal is input, and the step of extracting valid data from the delay profile on the basis of the average power value used in previous processing when it is detected that the reception environment remains unchanged.

55. A method according to claim 54, wherein the step of determining extracting the valid data comprises extracting the valid data by comparing the delay profile with a valid data determination threshold value and determining that only data equal to or larger than a valid data threshold is valid data.

56. A method according to claim 55, wherein said valid data determination threshold value is the larger of either a correlation value threshold or a maximum value threshold.

57. A method according to claim 54, wherein the correlation threshold value is determined by multiplying said average power value of the correlation data by a predetermined value to absorb a variance of interference wave levels.

58. A method according to claim 54, wherein the maximum peak value threshold is determined by multiplying a maximum peak value retrieved by a second predetermined value.

59. A method according to claim 54, wherein the step of detecting a plurality of correlation peak positions from the extracted valid data comprises comparing said data from the delay profile to the maximum peak value and whereby if said data is equal to or larger than said maximum peak value then the maximum peak value is replaced with the data from the delay profile.

* * * * *